US012631785B2

(12) United States Patent (10) Patent No.: US 12,631,785 B2
Fuchey et al. (45) Date of Patent: May 19, 2026

(54) GEOLOGIC ANALOGUE SEARCH FRAMEWORK

(71) Applicant: Schlumberger Technology Corporation, Sugar Land, TX (US)

(72) Inventors: Yannick Fuchey, Montpellier (FR); Valerian Guillot, Montpellier (FR)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 399 days.

(21) Appl. No.: 18/261,396

(22) PCT Filed: Jan. 14, 2021

(86) PCT No.: PCT/US2021/013460
§ 371 (c)(1),
(2) Date: Jul. 13, 2023

(87) PCT Pub. No.: WO2022/154792
PCT Pub. Date: Jul. 21, 2022

(65) Prior Publication Data
US 2024/0077642 A1 Mar. 7, 2024

(51) Int. Cl.
*G01V 20/00* (2024.01)
*G06F 16/248* (2019.01)
(Continued)

(52) U.S. Cl.
CPC ............ *G01V 20/00* (2024.01); *G06F 16/248* (2019.01); *G06F 16/287* (2019.01); *G06F 16/29* (2019.01)

(58) Field of Classification Search
CPC ..... G01V 20/00; G06F 16/287; G06F 16/248; G06F 16/29
See application file for complete search history.

(56) References Cited

U.S. PATENT DOCUMENTS 4,991,095 A * 2/1991 Swanson ................ G01V 1/282
367/69
2010/0030527 A1* 2/2010 Prasad .................... E21B 10/00
703/7
(Continued)

FOREIGN PATENT DOCUMENTS

EP 2677347 A2 12/2013
WO 2019236339 A1 12/2019

OTHER PUBLICATIONS

Freire, et al., Searching for Potential Analogues for the Pre-Salt Santos Basin, Brazil: High-Resolution Stratigraphic Studies of Microbialite-Bearing Successions from Salta Basin, Argentina, In AAPG International Conference & Exhibition, Jan. 2011, 1 Page.
(Continued)

*Primary Examiner* — Lina Cordero
*Assistant Examiner* — Lyudmila Zaykova-Feldman
(74) *Attorney, Agent, or Firm* — Kyle R. Miiller

(57) ABSTRACT

A method can include, responsive to receipt of a search instruction that includes one or more search criteria, accessing a data structure for subsurface geologic regions categorized at least in part according to parameters that describe depositional environments, where the data structure includes one or more includes virtual distances between the parameters; generating a search result using the one or more search criteria and the data structure, where the search result represents an organization of at least a portion of subsurface geologic regions as closest analogues to the one or more search criteria; and transmitting search result information for graphically rendering the search result to a display as part of an interactive graphical user interface.

20 Claims, 19 Drawing Sheets

(51) Int. Cl.
    *G06F 16/28*        (2019.01)
    *G06F 16/29*        (2019.01)

(56)            References Cited

U.S. PATENT DOCUMENTS

| | | | | |
|---|---|---|---|---|
| 2011/0022363 A1* | 1/2011 | Furman | | G06F 30/20 |
| | | | | 703/1 |
| 2013/0204598 A1* | 8/2013 | Mallet | | G01V 20/00 |
| | | | | 703/6 |
| 2018/0322232 A1* | 11/2018 | Klinger | | G01V 20/00 |
| 2021/0404261 A1* | 12/2021 | Helming | | E21B 7/15 |
| 2022/0188338 A1* | 6/2022 | Davies | | G01V 20/00 |

OTHER PUBLICATIONS

Cui et al., "The Fibonacci-Type Sequence Revisited: A Geometric Progression", Far East Journal of Mathematical Sciences (FJMS), vol. 106, No. 2, 2018, pp. 267-278.

Chandra et al., "Fibonacci Number", MathWorld—A Wolfram Web Resource, Retrieved From https://mathworld.wolfram.com/FibonacciNumber.html, Retrieved on Nov. 1, 2024, 20 Pages.
International Search Report and Written Opinion of International Patent Application No. PCT/US2021/013460 dated on Mar. 31, 2021, 11 Pages.
Yang, et al., 'Design and Implementation of a Professional Search Engine', 7th International Conference on Modelling, Identification and Control (ICMIC), Dec. 18-20, 2015, 6 Pages.
Extended European Search Report of European Patent Application No. 21920012.8, dated on Sep. 11, 2024, 8 Pages.
Peters et al., "The Paleobiology Database application programming interface", Paleobiology, 42(1), 2016, pp. 1-7.
Clayton Mellina, Introducing Similarity Search at Flickr, https://code.flickr.net/2017/03/07/introducing-similarity-search-at-flickr/, Mar. 7, 2017, 8 pages.
Devyn Hinkle, How Streaming Services Use Algorithms—AMT Lab @ CMU, 26 pages, Aug. 18, 2021.

* cited by examiner

System 100

System 300

500

<u>700</u>

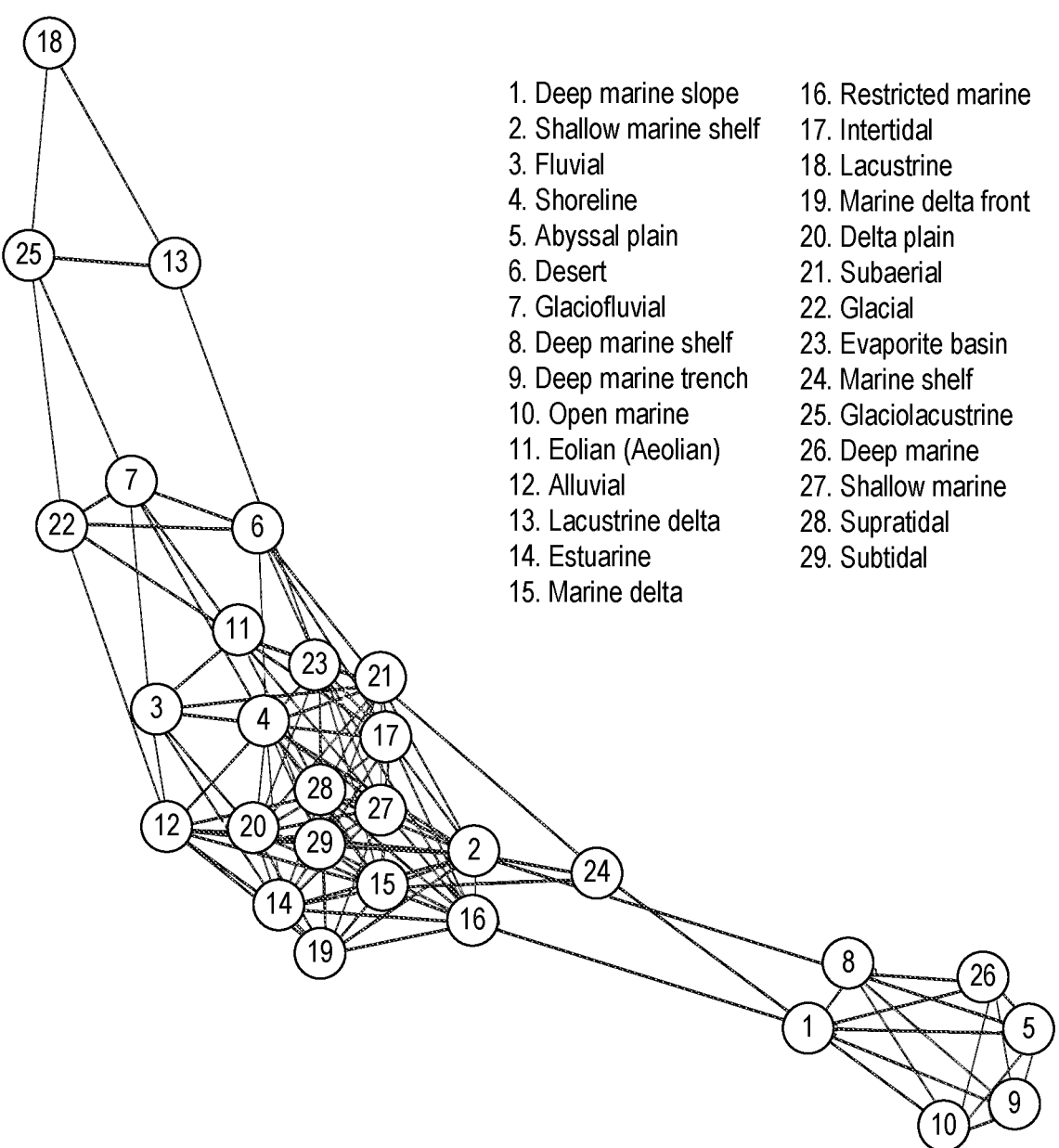

1. Deep marine slope
2. Shallow marine shelf
3. Fluvial
4. Shoreline
5. Abyssal plain
6. Desert
7. Glaciofluvial
8. Deep marine shelf
9. Deep marine trench
10. Open marine
11. Eolian (Aeolian)
12. Alluvial
13. Lacustrine delta
14. Estuarine
15. Marine delta
16. Restricted marine
17. Intertidal
18. Lacustrine
19. Marine delta front
20. Delta plain
21. Subaerial
22. Glacial
23. Evaporite basin
24. Marine shelf
25. Glaciolacustrine
26. Deep marine
27. Shallow marine
28. Supratidal
29. Subtidal

Fig. 7

810
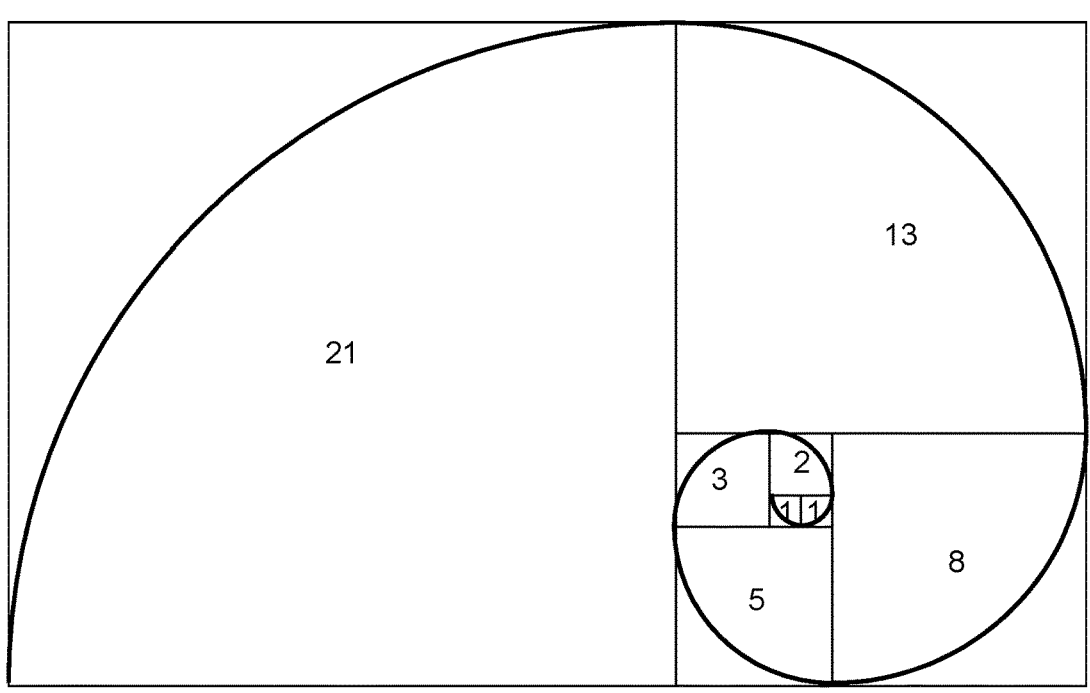
830
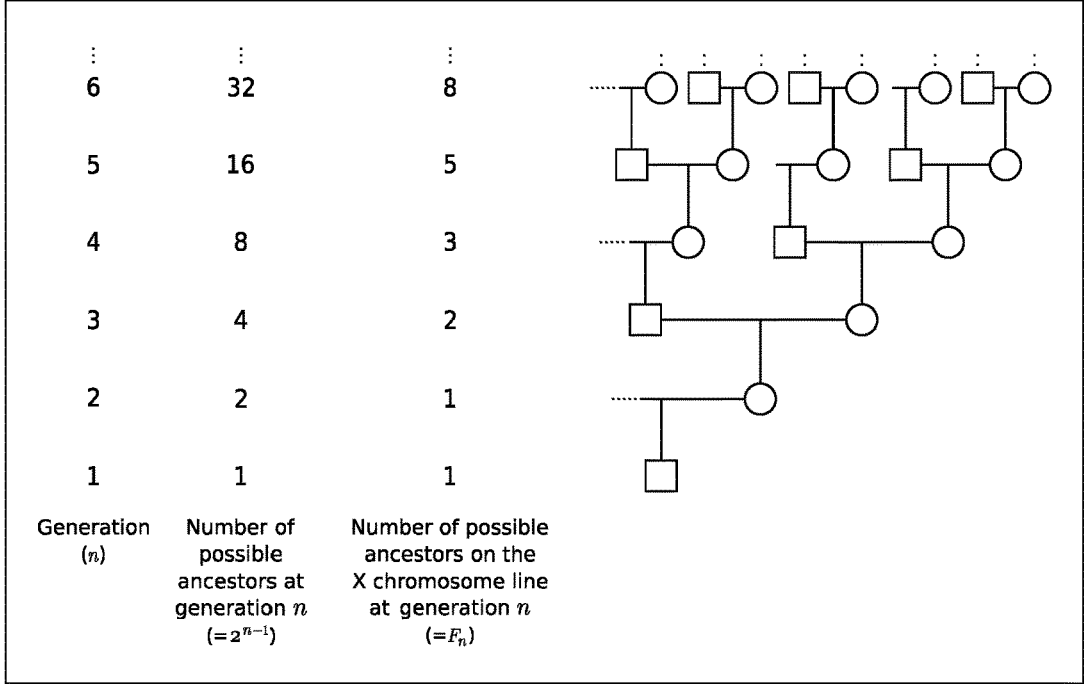
Fig. 8

900

$F_n = 0, 1, 2, 3, 5, 8, 13, 21, 34, 55, 89$

|  | DMS | SMS | Fluvial | Shoreline | Abyssal plain | Desert |
|---|---|---|---|---|---|---|
| Deep marine slope | 0 |  |  |  |  |  |
| Shallow marine shelf | 21 | 0 |  |  |  |  |
| Fluvial | 34 | 21 | 0 |  |  |  |
| Shoreline | 21 | 13 | 13 | 0 |  |  |
| Abyssal plain | 3 | 89 | 89 | 89 | 0 |  |
| Desert | 55 | 34 | 21 | 13 | 55 | 0 |
| Glaciofluvial | 89 | 55 | 13 | 13 | 89 | 13 |
| Deep marine shelf | 5 | 13 | 55 | 55 | 8 | 55 |
| Deep marine trench | 3 | 21 | 55 | 55 | 8 | 55 |
| Open marine | 1 | 34 | 89 | 89 | 2 | 89 |
| Eolian | 34 | 21 | 13 | 3 | 89 | 1 |
| Alluvial | 55 | 34 | 8 | 8 | 55 | 21 |
| Lacustrine delta | 55 | 55 | 21 | 34 | 89 | 34 |
| Estuarine | 21 | 13 | 13 | 13 | 55 | 21 |
| Marine delta | 21 | 8 | 21 | 13 | 55 | 21 |
| Restricted marine | 13 | 3 | 34 | 21 | 55 | 21 |
| Intertidal | 21 | 5 | 21 | 5 | 55 | 13 |
| Lacustrine | 55 | 55 | 21 | 34 | 89 | 34 |
| Marine delta front | 21 | 8 | 21 | 21 | 55 | 21 |
| Delta plain | 34 | 13 | 13 | 13 | 55 | 21 |
| Subaerial | 21 | 13 | 13 | 5 | 55 | 8 |
| Glacial | 89 | 55 | 21 | 34 | 89 | 13 |
| Evaporite basin | 34 | 21 | 34 | 8 | 55 | 8 |
| Marine shelf | 13 | 2 | 34 | 21 | 34 | 21 |
| Glaciolacustrine | 89 | 55 | 21 | 55 | 55 | 21 |
| Deep marine | 3 | 34 | 89 | 55 | 2 | 89 |
| Shallow marine | 21 | 1 | 34 | 8 | 34 | 34 |
| Supratidal | 21 | 5 | 21 | 2 | 34 | 21 |
| Subtidal | 21 | 3 | 21 | 2 | 34 | 21 |

World Map 1110

Well XYZ

1130

1150

1500

Diagenetic
Information
1520

Porosity,
Permeability,
and/or Depth
1530

Cluster Asset/
Field using
Similarity
1510

Depositional
Environment
(string)
1540

Age
1550

String Age to
Float Age
Conversion
1555

Depositional
Environment
Distance Metric
(geology)
1560

Dictionary
1565

Depositional
Environment
Distance Metric
(lithology)
1570

Dictionary
1575

Lithologies of
Reservoir
1580

Litho String
Conversion
1584

Synonym
Merge
1588

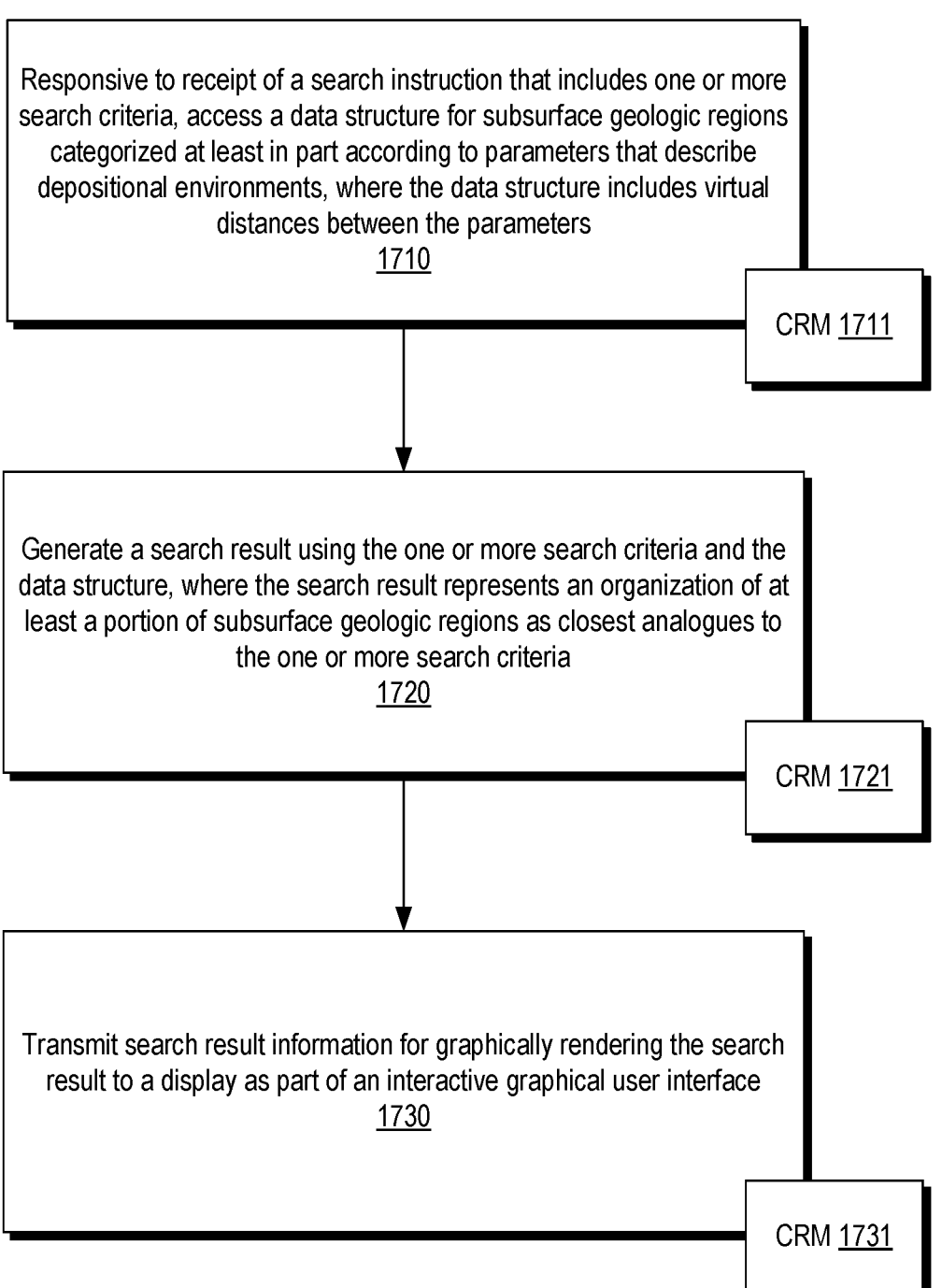

Responsive to receipt of a search instruction that includes one or more search criteria, access a data structure for subsurface geologic regions categorized at least in part according to parameters that describe depositional environments, where the data structure includes virtual distances between the parameters
1710

CRM 1711

Generate a search result using the one or more search criteria and the data structure, where the search result represents an organization of at least a portion of subsurface geologic regions as closest analogues to the one or more search criteria
1720

CRM 1721

Transmit search result information for graphically rendering the search result to a display as part of an interactive graphical user interface
1730

CRM 1731

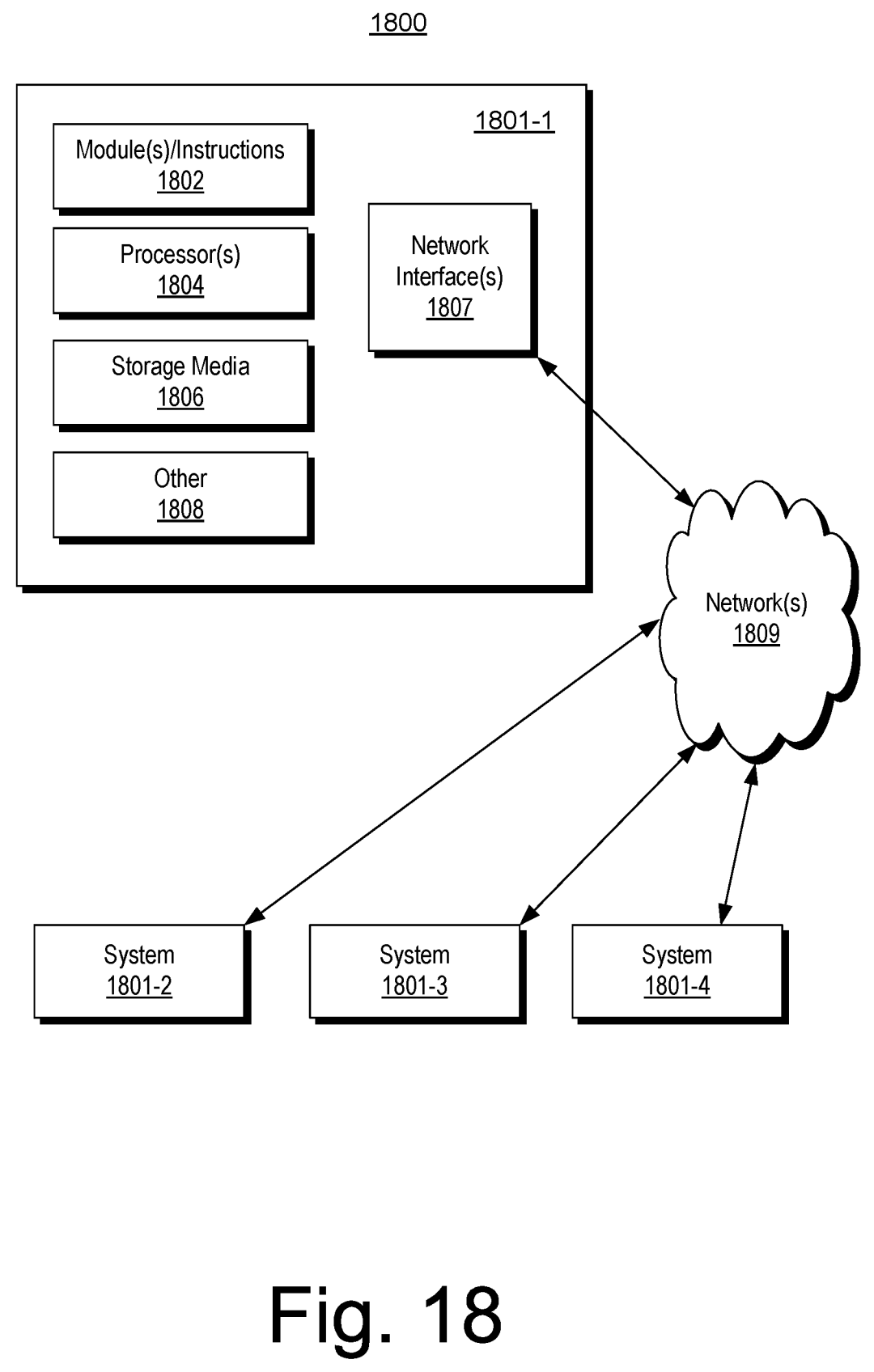

Module(s)/Instructions
1802

Processor(s)
1804

Storage Media
1806

Other
1808

Network
Interface(s)
1807

Network(s)
1809

System
1801-2

System
1801-3

System
1801-4

Fig. 18

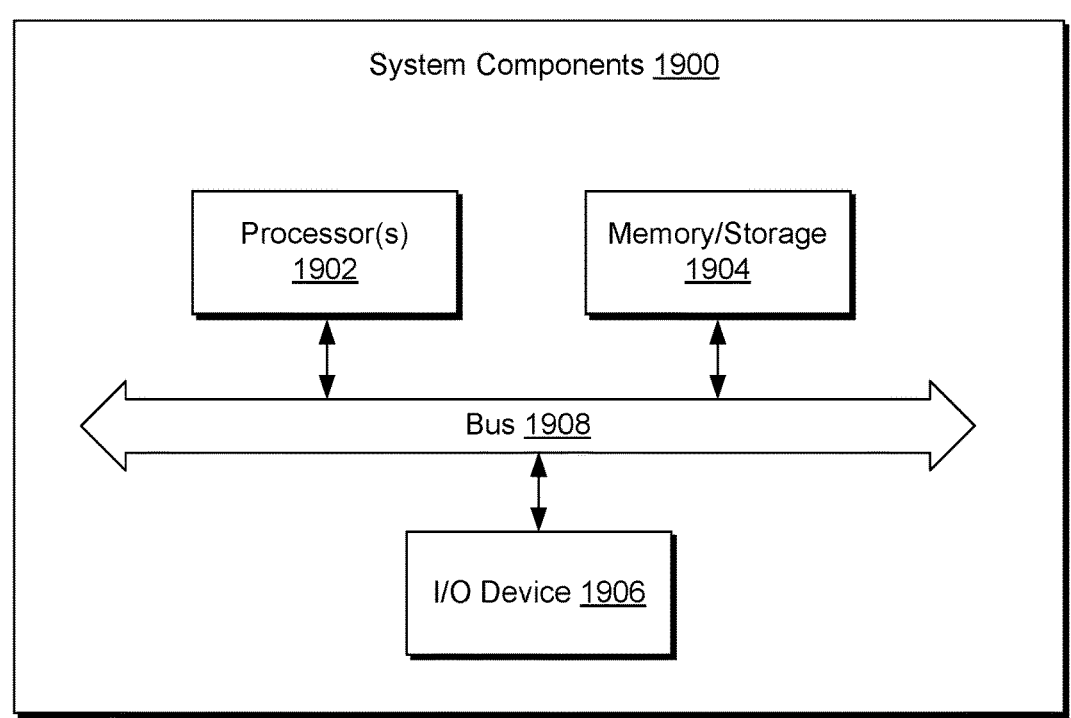
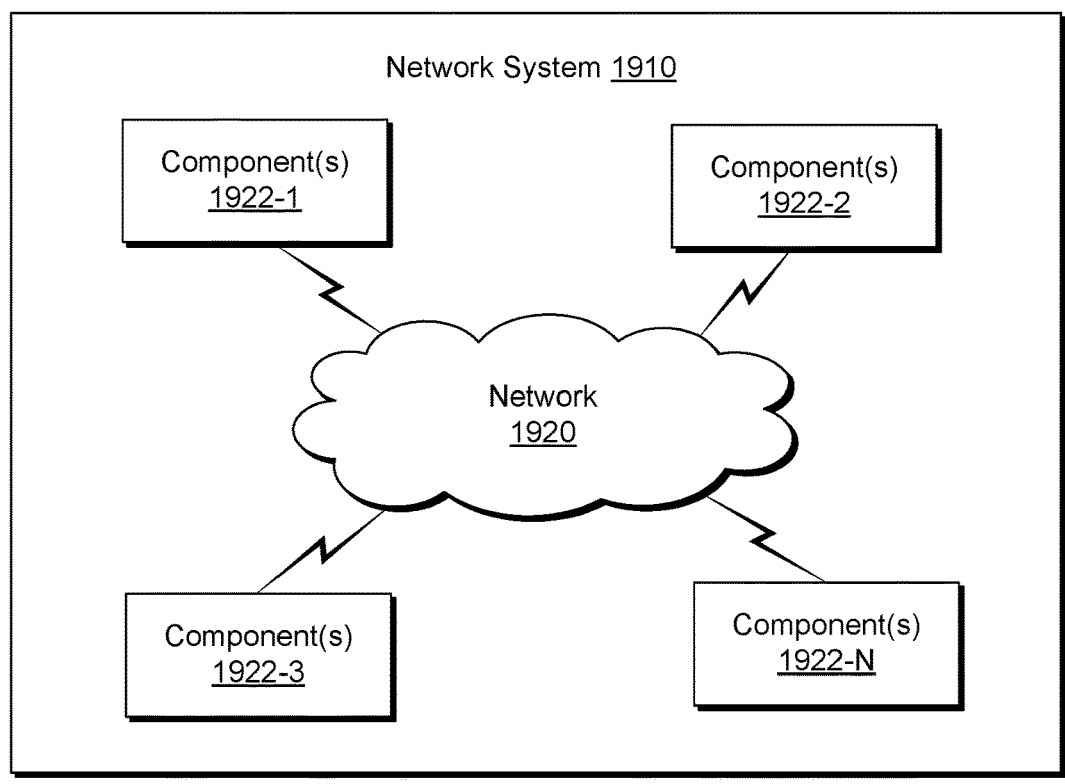
Fig. 19

GEOLOGIC ANALOGUE SEARCH FRAMEWORK

CROSS-REFERENCE TO RELATED APPLICATIONS

This application is a National Stage Entry of International Application No. PCT/US2021/013460, filed Jan. 14, 2021, which is incorporated herein by reference.

BACKGROUND

A reservoir can be a subsurface formation that can be characterized at least in part by its porosity and fluid permeability. As an example, a reservoir may be part of a basin such as a sedimentary basin. A basin can be a depression (e.g., caused by plate tectonic activity, subsidence, etc.) in which sediments accumulate. As an example, where hydrocarbon source rocks occur in combination with appropriate depth and duration of burial, a petroleum system may develop within a basin, which may form a reservoir that includes hydrocarbon fluids (e.g., oil, gas, etc.).

An analogue can be an example of an exposed structure that is used for comparison to a subsurface structure (e.g., not exposed at the surface of the Earth). In oil and gas exploration, geoscientists and engineers may compare subterranean structures with surface exposures deemed analogs where they may be thought to be similar in depositional environment and reservoir character to the subterranean structures. Such comparisons may be part of an interpretation process and based on direct visual comparisons of surface imagery to a stratigraphic model (e.g., a layer cake type of model, etc.) of a subterranean region. For example, layers seen in a surface image of an outcrop rendered to a display may be visually compared to layers seen in a stratigraphic model rendered to a display. An outcrop can be a body of rock exposed at the surface of the Earth, which may be exposed naturally or due to one or more human actions (e.g., construction of a highway, construction of a railroad, open pit mining, etc.).

In oil and gas exploration, interpretation is a process that involves analysis of data to identify and locate various subsurface structures (e.g., horizons, faults, geobodies, etc.) in a geologic environment. Various types of structures (e.g., stratigraphic formations) may be indicative of hydrocarbon traps or flow channels, as may be associated with one or more reservoirs (e.g., fluid reservoirs). In the field of resource extraction, enhancements to interpretation can allow for construction of a more accurate model of a subsurface region, which, in turn, may improve characterization of the subsurface region for purposes of resource extraction. Characterization of one or more subsurface regions in a geologic environment can guide, for example, performance of one or more operations (e.g., field operations, etc.). As an example, a more accurate model of a subsurface region may make a drilling operation more accurate as to a borehole's trajectory where the borehole is to have a trajectory that penetrates a reservoir, etc.

SUMMARY

A method can include, responsive to receipt of a search instruction that includes one or more search criteria, accessing a data structure for subsurface geologic regions categorized at least in part according to parameters that describe depositional environments, where the data structure includes virtual distances between the parameters; generating a search result using the one or more search criteria and the data structure, where the search result represents an organization of at least a portion of subsurface geologic regions as closest analogues to the one or more search criteria; and transmitting search result information for graphically rendering the search result to a display as part of an interactive graphical user interface. A system can include one or more processors; memory accessible to at least one of the one or more processors; processor-executable instructions stored in the memory and executable to instruct the system to: responsive to receipt of a search instruction that includes one or more search criteria, access a data structure for subsurface geologic regions categorized at least in part according to parameters that describe depositional environments, where the data structure includes virtual distances between the parameters; generate a search result using the one or more search criteria and the data structure, where the search result represents an organization of at least a portion of subterranean geologic regions as closest analogues to the one or more search criteria; and transmit search result information for graphically rendering the search result to a display as part of an interactive graphical user interface. One or more computer-readable storage media can include processor-executable instructions to instruct a computing system to: responsive to receipt of a search instruction that includes one or more search criteria, access a data structure for subsurface geologic regions categorized at least in part according to parameters that describe depositional environments, where the data structure includes virtual distances between the parameters; generate a search result using the one or more search criteria and the data structure, where the search result represents an organization of at least a portion of subterranean geologic regions as closest analogues to the one or more search criteria; and transmit search result information for graphically rendering the search result to a display as part of an interactive graphical user interface. Various other apparatuses, systems, methods, etc., are also disclosed.

This summary is provided to introduce a selection of concepts that are further described below in the detailed description. This summary is not intended to identify key or essential features of the claimed subject matter, nor is it intended to be used as an aid in limiting the scope of the claimed subject matter.

BRIEF DESCRIPTION OF THE DRAWINGS

Features and advantages of the described implementations can be more readily understood by reference to the following description taken in conjunction with the accompanying drawings.

FIG. 7 illustrates an example of a graphic renderable to a graphical user interface;

FIG. 8 illustrates examples of sequences;

FIG. 9 illustrates an example of a data structure;

FIG. 15 illustrates an example of a system;

FIG. 17 illustrates an example of a method;

FIG. 18 illustrates examples of computer and network equipment; and

FIG. 19 illustrates example components of a system and a networked system.

DETAILED DESCRIPTION

This description is not to be taken in a limiting sense, but rather is made merely for the purpose of describing the general principles of the implementations. The scope of the described implementations should be ascertained with reference to the issued claims.

Figure 1:
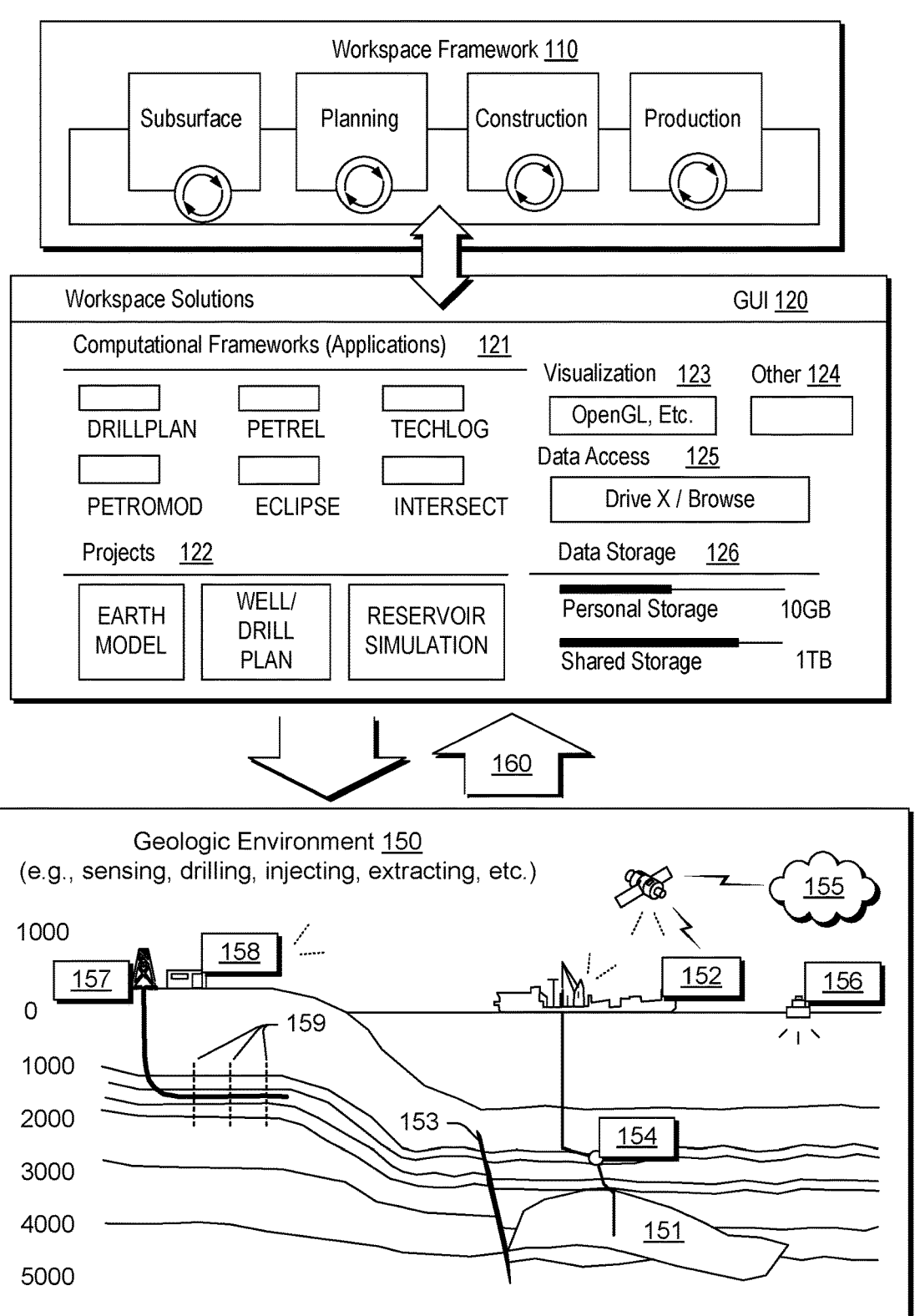
FIG. 1 illustrates an example system that includes various framework components associated with one or more geologic environments.

FIG. 1 shows an example of a system 100 that includes a workspace framework 110 that can provide for instantiation of, rendering of, interactions with, etc., a graphical user interface (GUI) 120. In the example of FIG. 1, the GUI 120 can include graphical controls for computational frameworks (e.g., applications) 121, projects 122, visualization 123, one or more other features 124, data access 125, and data storage 126.

In the example of FIG. 1, the workspace framework 110 may be tailored to a particular geologic environment such as an example geologic environment 150. For example, the geologic environment 150 may include layers (e.g., stratification) that include a reservoir 151 and that may be intersected by a fault 153. As an example, the geologic environment 150 may be outfitted with a variety of sensors, detectors, actuators, etc. For example, equipment 152 may include communication circuitry to receive and to transmit information with respect to one or more networks 155. Such information may include information associated with downhole equipment 154, which may be equipment to acquire information, to assist with resource recovery, etc. Other equipment 156 may be located remote from a wellsite and include sensing, detecting, emitting or other circuitry. Such equipment may include storage and communication circuitry to store and to communicate data, instructions, etc. As an example, one or more satellites may be provided for purposes of communications, data acquisition, etc. For example, FIG. 1 shows a satellite in communication with the network 155 that may be configured for communications, noting that the satellite may additionally or alternatively include circuitry for imagery (e.g., spatial, spectral, temporal, radiometric, etc.).

FIG. 1 also shows the geologic environment 150 as optionally including equipment 157 and 158 associated with a well that includes a substantially horizontal portion that may intersect with one or more fractures 159. For example, consider a well in a shale formation that may include natural fractures, artificial fractures (e.g., hydraulic fractures) or a combination of natural and artificial fractures. As an example, a well may be drilled for a reservoir that is laterally extensive. In such an example, lateral variations in properties, stresses, etc. may exist where an assessment of such variations may assist with planning, operations, etc. to develop a laterally extensive reservoir (e.g., via fracturing, injecting, extracting, etc.). As an example, the equipment 157 and/or 158 may include components, a system, systems, etc. for fracturing, seismic sensing, analysis of seismic data, assessment of one or more fractures, etc.

In the example of FIG. 1, the GUI 120 shows some examples of computational frameworks, including the DRILLPLAN, PETREL, TECHLOG, PETROMOD, ECLIPSE, and INTERSECT frameworks (Schlumberger Limited, Houston, Texas).

The DRILLPLAN framework provides for digital well construction planning and includes features for automation of repetitive tasks and validation workflows, enabling improved quality drilling programs (e.g., digital drilling plans, etc.) to be produced quickly with assured coherency.

The PETREL framework can be part of the DELFI cognitive E&P environment (Schlumberger Limited, Houston, Texas) for utilization in geosciences and geoengineering, for example, to analyze subsurface data from exploration to production of fluid from a reservoir.

The TECHLOG framework can handle and process field and laboratory data for a variety of geologic environments (e.g., deepwater exploration, shale, etc.). The TECHLOG framework can structure wellbore data for analyses, planning, etc.

The PETROMOD framework provides petroleum systems modeling capabilities that can combine one or more of seismic, well, and geological information to model the evolution of a sedimentary basin. The PETROMOD framework can predict if, and how, a reservoir has been charged with hydrocarbons, including the source and timing of hydrocarbon generation, migration routes, quantities, and hydrocarbon type in the subsurface or at surface conditions.

The ECLIPSE framework provides a reservoir simulator (e.g., as a computational framework) with numerical solutions for fast and accurate prediction of dynamic behavior for various types of reservoirs and development schemes.

The INTERSECT framework provides a high-resolution reservoir simulator for simulation of detailed geological features and quantification of uncertainties, for example, by creating accurate production scenarios and, with the integration of precise models of the surface facilities and field operations, the INTERSECT framework can produce reliable results, which may be continuously updated by real-time data exchanges (e.g., from one or more types of data acquisition equipment in the field that can acquire data during one or more types of field operations, etc.). The INTERSECT framework can provide completion configurations for complex wells where such configurations can be built in the field, can provide detailed chemical-enhanced-oil-recovery (EOR) formulations where such formulations can be implemented in the field, can analyze application of steam injection and other thermal EOR techniques for implementation in the field, advanced production controls in terms of reservoir coupling and flexible field management, and flexibility to script customized solutions for improved modeling and field management control. The INTERSECT framework, as with the other example frameworks, may be utilized as part of the DELFI cognitive E&P environment, for example, for rapid simulation of multiple concurrent cases. For example, a workflow may utilize one or more of the DELFI on demand reservoir simulation features.

The aforementioned DELFI environment provides various features for workflows as to subsurface analysis, planning, construction and production, for example, as illustrated in the workspace framework 110. As shown in FIG. 1, outputs from the workspace framework 110 can be utilized for directing, controlling, etc., one or more processes in the geologic environment 150 and, feedback 160, can be received via one or more interfaces in one or more forms (e.g., acquired data as to operational conditions, equipment conditions, environment conditions, etc.).

As an example, a workflow may progress to a geology and geophysics ("G&G") service provider, which may generate a well trajectory, which may involve execution of one or more G&G software packages. Examples of such software packages include the PETREL framework. As an example, a system or systems may utilize a framework such as the DELFI framework (Schlumberger Limited, Houston, Texas). Such a framework may operatively couple various other frameworks to provide for a multi-framework workspace. As an example, the GUI 120 of FIG. 1 may be a GUI of the DELFI framework.

In the example of FIG. 1, the visualization features 123 may be implemented via the workspace framework 110, for example, to perform tasks as associated with one or more of subsurface regions, planning operations, constructing wells and/or surface fluid networks, and producing from a reservoir.

As an example, a visualization process can implement one or more of various features that can be suitable for one or more web applications. For example, a template may involve use of the JAVASCRIPT object notation format (JSON) and/or one or more other languages/formats. As an example, a framework may include one or more converters. For example, consider a JSON to PYTHON converter and/or a PYTHON to JSON converter.

As an example, visualization features can provide for visualization of various earth models, properties, etc., in one or more dimensions. As an example, visualization features can provide for rendering of information in multiple dimensions, which may optionally include multiple resolution rendering. In such an example, information being rendered may be associated with one or more frameworks and/or one or more data stores. As an example, visualization features may include one or more control features for control of equipment, which can include, for example, field equipment that can perform one or more field operations. As an example, a workflow may utilize one or more frameworks to generate information that can be utilized to control one or more types of field equipment (e.g., drilling equipment, wireline equipment, fracturing equipment, etc.).

As to a reservoir model that may be suitable for utilization by a simulator, consider acquisition of seismic data as acquired via reflection seismology, which finds use in geophysics, for example, to estimate properties of subsurface formations. As an example, reflection seismology may provide seismic data representing waves of elastic energy (e.g., as transmitted by P-waves and S-waves, in a frequency range of approximately 1 Hz to approximately 100 Hz). Seismic data may be processed and interpreted, for example, to understand better composition, fluid content, extent and geometry of subsurface rocks. Such interpretation results can be utilized to plan, simulate, perform, etc., one or more operations for production of fluid from a reservoir (e.g., reservoir rock, etc.).

Field acquisition equipment may be utilized to acquire seismic data, which may be in the form of traces where a trace can include values organized with respect to time and/or depth (e.g., consider 1D, 2D, 3D or 4D seismic data). For example, consider acquisition equipment that acquires digital samples at a rate of one sample per approximately 4 ms. Given a speed of sound in a medium or media, a sample rate may be converted to an approximate distance. For example, the speed of sound in rock may be on the order of around 5 km per second. Thus, a sample time spacing of approximately 4 ms would correspond to a sample "depth"

spacing of about 10 meters (e.g., assuming a path length from source to boundary and boundary to sensor). As an example, a trace may be about 4 seconds in duration; thus, for a sampling rate of one sample at about 4 ms intervals, such a trace would include about 1000 samples where latter acquired samples correspond to deeper reflection boundaries. If the 4 second trace duration of the foregoing example is divided by two (e.g., to account for reflection), for a vertically aligned source and sensor, a deepest boundary depth may be estimated to be about 10 km (e.g., assuming a speed of sound of about 5 km per second).

As an example, a model may be a simulated version of a geologic environment. As an example, a simulator may include features for simulating physical phenomena in a geologic environment based at least in part on a model or models. A simulator, such as a reservoir simulator, can simulate fluid flow in a geologic environment based at least in part on a model that can be generated via a framework that receives seismic data. A simulator can be a computerized system (e.g., a computing system) that can execute instructions using one or more processors to solve a system of equations that describe physical phenomena subject to various constraints. In such an example, the system of equations may be spatially defined (e.g., numerically discretized) according to a spatial model that includes layers of rock, geobodies, etc., that have corresponding positions that can be based on interpretation of seismic and/or other data. A spatial model may be a cell-based model where cells are defined by a grid (e.g., a mesh). A cell in a cell-based model can represent a physical area or volume in a geologic environment where the cell can be assigned physical properties (e.g., permeability, fluid properties, etc.) that may be germane to one or more physical phenomena (e.g., fluid volume, fluid flow, pressure, etc.). A reservoir simulation model can be a spatial model that may be cell-based.

A simulator can be utilized to simulate the exploitation of a real reservoir, for example, to examine different productions scenarios to find an optimal one before production or further production occurs. A reservoir simulator does not provide an exact replica of flow in and production from a reservoir at least in part because the description of the reservoir and the boundary conditions for the equations for flow in a porous rock are generally known with an amount of uncertainty. Certain types of physical phenomena occur at a spatial scale that can be relatively small compared to size of a field. A balance can be struck between model scale and computational resources that results in model cell sizes being of the order of meters; rather than a lesser size (e.g., a level of detail of pores). A modeling and simulation workflow for multiphase flow in porous media (e.g., reservoir rock, etc.) can include generalizing real micro-scale data from macro scale observations (e.g., seismic data and well data) and upscaling to a manageable scale and problem size. Uncertainties can exist in input data and solution procedure such that simulation results too are to some extent uncertain. A process known as history matching can involve comparing simulation results to actual field data acquired during production of fluid from a field. Information gleaned from history matching, can provide for adjustments to a model, data, etc., which can help to increase accuracy of simulation.

As an example, a simulator may utilize various types of constructs, which may be referred to as entities. Entities may include earth entities or geological objects such as wells, surfaces, reservoirs, etc. Entities can include virtual representations of actual physical entities that may be reconstructed for purposes of simulation. Entities may include entities based on data acquired via sensing, observation, etc. (e.g., consider entities based at least in part on seismic data and/or other information). As an example, an entity may be characterized by one or more properties (e.g., a geometrical pillar grid entity of an earth model may be characterized by a porosity property, etc.). Such properties may represent one or more measurements (e.g., acquired data), calculations, etc.

As an example, a simulator may utilize an object-based software framework, which may include entities based on pre-defined classes to facilitate modeling and simulation. As an example, an object class can encapsulate reusable code and associated data structures. Object classes can be used to instantiate object instances for use by a program, script, etc. For example, borehole classes may define objects for representing boreholes based on well data. A model of a basin, a reservoir, etc. may include one or more boreholes where a borehole may be, for example, for measurements, injection, production, etc. As an example, a borehole may be a wellbore of a well, which may be a completed well (e.g., for production of a resource from a reservoir, for injection of material, etc.).

While several simulators are illustrated in the example of FIG. 1, one or more other simulators may be utilized, additionally or alternatively. For example, consider the VISAGE geomechanics simulator (Schlumberger Limited, Houston Texas) or the PIPESIM network simulator (Schlumberger Limited, Houston Texas), etc. The VISAGE simulator includes finite element numerical solvers that may provide simulation results such as, for example, results as to compaction and subsidence of a geologic environment, well and completion integrity in a geologic environment, cap-rock and fault-seal integrity in a geologic environment, fracture behavior in a geologic environment, thermal recovery in a geologic environment, $CO_2$ disposal, etc. The PIPESIM simulator includes solvers that may provide simulation results such as, for example, multiphase flow results (e.g., from a reservoir to a wellhead and beyond, etc.), flowline and surface facility performance, etc. The PIPESIM simulator may be integrated, for example, with the AVOCET production operations framework (Schlumberger Limited, Houston Texas). As an example, a reservoir or reservoirs may be simulated with respect to one or more enhanced recovery techniques (e.g., consider a thermal process such as steam-assisted gravity drainage (SAGD), etc.). As an example, the PIPESIM simulator may be an optimizer that can optimize one or more operational scenarios at least in part via simulation of physical phenomena. The MAN-GROVE simulator (Schlumberger Limited, Houston, Texas) provides for optimization of stimulation design (e.g., stimulation treatment operations such as hydraulic fracturing) in a reservoir-centric environment. The MANGROVE framework can combine scientific and experimental work to predict geomechanical propagation of hydraulic fractures, reactivation of natural fractures, etc., along with production forecasts within 3D reservoir models (e.g., production from a drainage area of a reservoir where fluid moves via one or more types of fractures to a well and/or from a well). The MANGROVE framework can provide results pertaining to heterogeneous interactions between hydraulic and natural fracture networks, which may assist with optimization of the number and location of fracture treatment stages (e.g., stimulation treatment(s)), for example, to increase perforation efficiency and recovery.

The PETREL framework provides components that allow for optimization of exploration and development operations. The PETREL framework includes seismic to simulation software components that can output information for use in increasing reservoir performance, for example, by improving asset team productivity. Through use of such a framework, various professionals (e.g., geophysicists, geologists, and reservoir engineers) can develop collaborative workflows and integrate operations to streamline processes (e.g., with respect to one or more geologic environments, etc.). Such a framework may be considered an application (e.g., executable using one or more devices) and may be considered a data-driven application (e.g., where data is input for purposes of modeling, simulating, etc.).

As mentioned, a framework may be implemented within or in a manner operatively coupled to the DELFI cognitive exploration and production (E&P) environment (Schlumberger, Houston, Texas), which is a secure, cognitive, cloud-based collaborative environment that integrates data and workflows with digital technologies, such as artificial intelligence and machine learning. As an example, such an environment can provide for operations that involve one or more frameworks. The DELFI environment may be referred to as the DELFI framework, which may be a framework of frameworks. As an example, the DELFI framework can include various other frameworks, which can include, for example, one or more types of models (e.g., simulation models, etc.).

Figure 2:
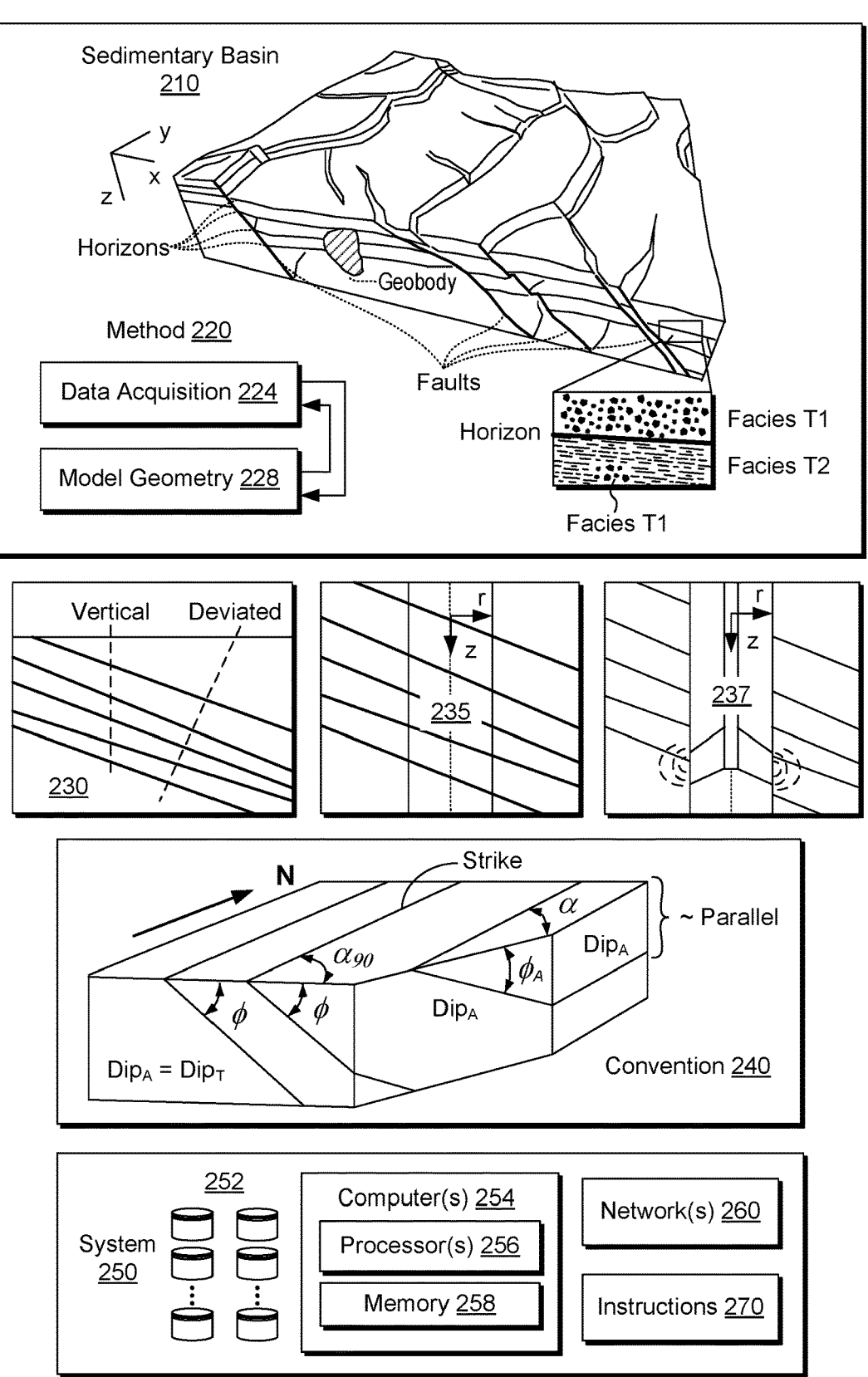
FIG. 2 illustrates examples of a basin, a convention and a system.

FIG. 2 shows an example of a sedimentary basin 210 (e.g., a geologic environment), an example of a method 220 for model building (e.g., for a simulator, etc.), an example of a formation 230, an example of a borehole 235 in a formation, an example of a convention 240 and an example of a system 250.

As an example, data acquisition, reservoir simulation, petroleum systems modeling, etc. may be applied to characterize various types of subsurface environments, including environments such as those of FIG. 1.

In FIG. 2, the sedimentary basin 210, which is a geologic environment, includes horizons, faults, one or more geobodies and facies formed over some period of geologic time. These features are distributed in two or three dimensions in space, for example, with respect to a Cartesian coordinate system (e.g., x, y and z) or other coordinate system (e.g., cylindrical, spherical, etc.). As shown, the model building method 220 includes a data acquisition block 224 and a model geometry block 228. Some data may be involved in building an initial model and, thereafter, the model may optionally be updated in response to model output, changes in time, physical phenomena, additional data, etc. As an example, data for modeling may include one or more of the following: depth or thickness maps and fault geometries and timing from seismic, remote-sensing, electromagnetic, gravity, outcrop and well log data. Furthermore, data may include depth and thickness maps stemming from facies variations (e.g., due to seismic unconformities) assumed to following geological events ("iso" times) and data may include lateral facies variations (e.g., due to lateral variation in sedimentation characteristics).

To proceed to modeling of geological processes, data may be provided, for example, data such as geochemical data (e.g., temperature, kerogen type, organic richness, etc.), timing data (e.g., from paleontology, radiometric dating, magnetic reversals, rock and fluid properties, etc.) and boundary condition data (e.g., heat-flow history, surface temperature, paleowater depth, etc.).

In basin and petroleum systems modeling, quantities such as temperature, pressure and porosity distributions within the sediments may be modeled, for example, by solving partial differential equations (PDEs) using one or more numerical techniques. Modeling may also model geometry with respect to time, for example, to account for changes stemming from geological events (e.g., deposition of material, erosion of material, shifting of material, etc.).

As shown in FIG. 2, the formation 230 includes a horizontal surface and various subsurface layers. As an example, a borehole may be vertical. As another example, a borehole may be deviated. In the example of FIG. 2, the borehole 235 may be considered a vertical borehole, for example, where the z-axis extends downwardly normal to the horizontal surface of the formation 230. As an example, a tool 237 may be positioned in a borehole, for example, to acquire information. As mentioned, a borehole tool can include one or more sensors that can acquire borehole images via one or more imaging techniques. A data acquisition sequence for such a tool can include running the tool into a borehole with acquisition pads closed, opening and pressing the pads against a wall of the borehole, delivering electrical current into the material defining the borehole while translating the tool in the borehole, and sensing current remotely, which is altered by interactions with the material.

As an example, data can include geochemical data. For example, consider data acquired using X-ray fluorescence (XRF) technology, Fourier transform infrared spectroscopy (FTIR) technology and/or wireline geochemical technology.

As an example, one or more probes may be deployed in a bore via a wireline or wirelines. As an example, a probe may emit energy and receive energy where such energy may be analyzed to help determine mineral composition of rock surrounding a bore. As an example, nuclear magnetic resonance may be implemented (e.g., via a wireline, downhole NMR probe, etc.), for example, to acquire data as to nuclear magnetic properties of elements in a formation (e.g., hydrogen, carbon, phosphorous, etc.).

As an example, lithology scanning technology may be employed to acquire and analyze data. For example, consider the LITHO SCANNER technology marketed by Schlumberger Limited (Houston, Texas). As an example, a LITHO SCANNER tool may be a gamma ray spectroscopy tool.

As an example, a tool may be positioned to acquire information in a portion of a borehole. Analysis of such information may reveal vugs, dissolution planes (e.g., dissolution along bedding planes), stress-related features, dip events, etc. As an example, a tool may acquire information that may help to characterize a fractured reservoir, optionally where fractures may be natural and/or artificial (e.g., hydraulic fractures). Such information may assist with completions, stimulation treatment, etc. As an example, information acquired by a tool may be analyzed using a framework such as the aforementioned TECHLOG framework (Schlumberger Limited, Houston, Texas).

As an example, a workflow may utilize one or more types of data for one or more processes (e.g., stratigraphic modeling, basin modeling, completion designs, drilling, production, injection, etc.). As an example, one or more tools may provide data that can be used in a workflow or workflows that may implement one or more frameworks (e.g., PETREL, TECHLOG, PETROMOD, ECLIPSE, etc.).

As to the convention 240 for dip, as shown in FIG. 2, the three dimensional orientation of a plane can be defined by its dip and strike. Dip is the angle of slope of a plane from a horizontal plane (e.g., an imaginary plane) measured in a vertical plane in a specific direction. Dip may be defined by magnitude (e.g., also known as angle or amount) and azimuth (e.g., also known as direction). As shown in the convention 240 of FIG. 2, various angles θ indicate angle of slope downwards, for example, from an imaginary horizontal plane (e.g., flat upper surface); whereas, dip refers to the direction towards which a dipping plane slopes (e.g., which may be given with respect to degrees, compass directions, etc.). Another feature shown in the convention of FIG. 2 is strike, which is the orientation of the line created by the intersection of a dipping plane and a horizontal plane (e.g., consider the flat upper surface as being an imaginary horizontal plane).

Some additional terms related to dip and strike may apply to an analysis, for example, depending on circumstances, orientation of collected data, etc. One term is "true dip" (see, e.g., $Dip_T$ in the convention 240 of FIG. 2). True dip is the dip of a plane measured directly perpendicular to strike (see, e.g., line directed northwardly and labeled "strike" and angle $\alpha_{90}$) and also the maximum possible value of dip magnitude. Another term is "apparent dip" (see, e.g., $Dip_A$ in the convention 240 of FIG. 2). Apparent dip may be the dip of a plane as measured in any other direction except in the direction of true dip (see, e.g., $\phi_A$ as $Dip_A$ for angle $\alpha$); however, it is possible that the apparent dip is equal to the true dip (see, e.g., 0 as $Dip_A = Dip_T$ for angle $\alpha 90$ with respect to the strike). In other words, where the term apparent dip is used (e.g., in a method, analysis, algorithm, etc.), for a particular dipping plane, a value for "apparent dip" may be equivalent to the true dip of that particular dipping plane.

As shown in the convention 240 of FIG. 2, the dip of a plane as seen in a cross-section perpendicular to the strike is true dip (see, e.g., the surface with $\phi$ as $Dip_A = Dip_T$ for angle $\alpha_{90}$ with respect to the strike). As indicated, dip observed in a cross-section in any other direction is apparent dip (see, e.g., surfaces labeled $Dip_A$). Further, as shown in the convention 240 of FIG. 2, apparent dip may be approximately 0 degrees (e.g., parallel to a horizontal surface where an edge of a cutting plane runs along a strike direction).

In terms of observing dip in wellbores, true dip is observed in wells drilled vertically. In wells drilled in any other orientation (or deviation), the dips observed are apparent dips (e.g., which are referred to by some as relative dips). In order to determine true dip values for planes observed in such boreholes, as an example, a vector computation (e.g., based on the borehole deviation) may be applied to one or more apparent dip values.

As mentioned, another term that finds use in sedimentological interpretations from borehole images is "relative dip" (e.g., $Dip_R$). A value of true dip measured from borehole images in rocks deposited in very calm environments may be subtracted (e.g., using vector-subtraction) from dips in a sand body. In such an example, the resulting dips are called relative dips and may find use in interpreting sand body orientation.

A convention such as the convention 240 may be used with respect to an analysis, an interpretation, an attribute, etc. As an example, various types of features may be described, in part, by dip (e.g., sedimentary bedding, faults and fractures, cuestas, igneous dikes and sills, metamorphic foliation, etc.). As an example, dip may change spatially as a layer approaches a geobody. For example, consider a salt body that may rise due to various forces (e.g., buoyancy, etc.). In such an example, dip may trend upward as a salt body moves upward.

Seismic interpretation may aim to identify and/or classify one or more subsurface boundaries based at least in part on one or more dip parameters (e.g., angle or magnitude, azimuth, etc.). As an example, various types of features (e.g., sedimentary bedding, faults and fractures, cuestas, igneous dikes and sills, metamorphic foliation, etc.) may be described at least in part by angle, at least in part by azimuth, etc.

As an example, equations may be provided for petroleum expulsion and migration, which may be modeled and simulated, for example, with respect to a period of time. Petroleum migration from a source material (e.g., primary migration or expulsion) may include use of a saturation model where migration-saturation values control expulsion. Determinations as to secondary migration of petroleum (e.g., oil or gas), may include using hydrodynamic potential of fluid and accounting for driving forces that promote fluid flow. Such forces can include buoyancy gradient, pore pressure gradient, and capillary pressure gradient.

As shown in FIG. 2, the system 250 includes one or more information storage devices 252, one or more computers 254, one or more networks 260 and instructions 270. As to the one or more computers 254, each computer may include one or more processors (e.g., or processing cores) 256 and memory 258 for storing instructions, for example, consider the instructions 270 as including instructions executable by at least one of the one or more processors. As an example, a computer may include one or more network interfaces (e.g., wired or wireless), one or more graphics cards (e.g., one or more GPUs, etc.), a display interface (e.g., wired or wireless), etc. As an example, imagery such as surface imagery (e.g., satellite, geological, geophysical, etc.) may be stored, processed, communicated, etc. As an example, data may include SAR data, GPS data, etc. and may be stored, for example, in one or more of the storage devices 252. As an example, the system 250 may be local, remote or in part local and in part remote. As to remote resources, consider one or more cloud-based resources (e.g., as part of a cloud platform, etc.).

As an example, the instructions 270 may include instructions (e.g., stored in memory) executable by one or more processors to instruct the system 250 to perform various actions. As an example, the system 250 may be configured such that the instructions 270 provide for establishing one or more aspects of the workspace framework 110 of FIG. 1. As an example, one or more methods, techniques, etc. may be performed at least in part via instructions, which may be, for example, instructions of the instructions 270 of FIG. 2.

As an example, a framework can include various components. For example, a framework can include one or more components for prediction of reservoir performance, one or more components for optimization of an operation or operations, one or more components for control of production engineering operations, etc. As an example, a framework can include components for prediction of reservoir performance, optimization and control of production engineering operations performed at one or more reservoir wells. Such a framework may, for example, allow for implementation of various methods. For example, consider an approach that allows for a combination of physics-based and data-driven methods for modeling and forecasting a reservoir production.

Figure 3:
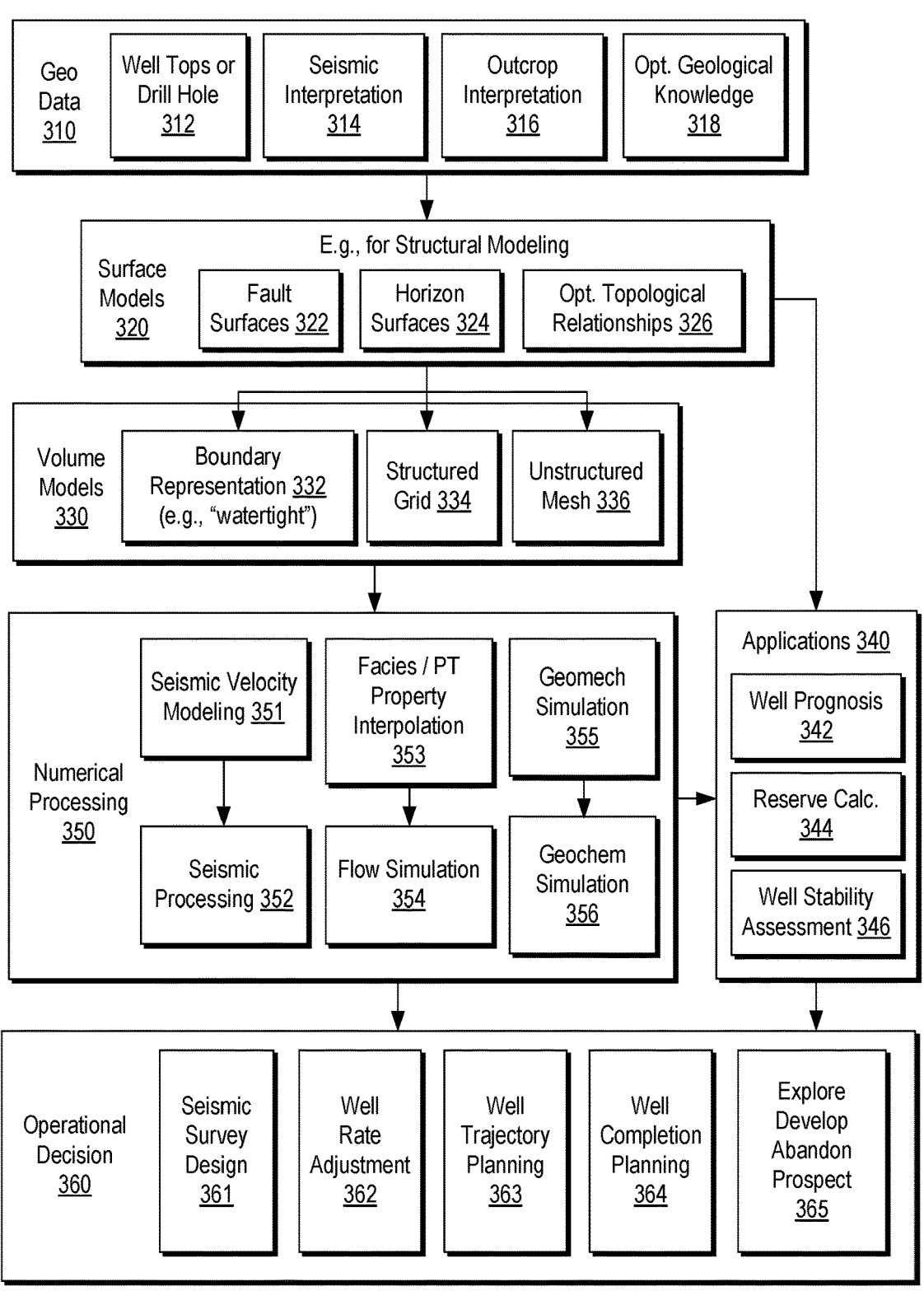
FIG. 3 illustrates an example of a system.

FIG. 3 shows an example of a system 300 that includes a geological/geophysical data block 310, a surface models block 320 (e.g., for one or more structural models), a volume modules block 330, an applications block 340, a numerical processing block 350 and an operational decision block 360. As shown in the example of FIG. 3, the geological/geophysical data block 310 can include data from well tops or drill holes 312, data from seismic interpretation 314, data from outcrop interpretation and optionally data from geological knowledge. As to the surface models block 320, it may provide for creation, editing, etc. of one or more surface models based on, for example, one or more of fault surfaces 322, horizon surfaces 324 and optionally topological relationships 326. As to the volume models block 330, it may provide for creation, editing, etc. of one or more volume models based on, for example, one or more of boundary representations 332 (e.g., to form a watertight model), structured grids 334 and unstructured meshes 336.

As shown in the example of FIG. 3, the system 300 may allow for implementing one or more workflows, for example, where data of the data block 310 are used to create, edit, etc. one or more surface models of the surface models block 320, which may be used to create, edit, etc. one or more volume models of the volume models block 330. As indicated in the example of FIG. 3, the surface models block 320 may provide one or more structural models, which may be input to the applications block 340. For example, such a structural model may be provided to one or more applications, optionally without performing one or more processes of the volume models block 330 (e.g., for purposes of numerical processing by the numerical processing block 350). Accordingly, the system 300 may be suitable for one or more workflows for structural modeling (e.g., optionally without performing numerical processing per the numerical processing block 350).

As to the applications block 340, it may include applications such as a well prognosis application 342, a reserve calculation application 344 and a well stability assessment application 346. As to the numerical processing block 350, it may include a process for seismic velocity modeling 351 followed by seismic processing 352, a process for facies and petrophysical property interpolation 353 followed by flow simulation 354, and a process for geomechanical simulation 355 followed by geochemical simulation 356. As indicated, as an example, a workflow may proceed from the volume models block 330 to the numerical processing block 350 and then to the applications block 340 and/or to the operational decision block 360. As another example, a workflow may proceed from the surface models block 320 to the applications block 340 and then to the operational decisions block 360 (e.g., consider an application that operates using a structural model).

In the example of FIG. 3, the operational decisions block 360 may include a seismic survey design process 361, a well rate adjustment process 362, a well trajectory planning process 363, a well completion planning process 364 and a process for one or more prospects, for example, to decide whether to explore, develop, abandon, etc. a prospect.

Referring again to the data block 310, the well tops or drill hole data 312 may include spatial localization, and optionally surface dip, of an interface between two geological formations or of a subsurface discontinuity such as a geological fault; the seismic interpretation data 314 may include a set of points, lines or surface patches interpreted from seismic reflection data, and representing interfaces between media (e.g., geological formations in which seismic wave velocity differs) or subsurface discontinuities; the outcrop interpretation data 316 may include a set of lines or points, optionally associated with measured dip, representing boundaries between geological formations or geological faults, as interpreted on the earth surface; and the geological knowledge data 318 may include, for example knowledge of the paleo-tectonic and sedimentary evolution of a region.

As to a structural model, it may be, for example, a set of gridded or meshed surfaces representing one or more interfaces between geological formations (e.g., horizon surfaces) or mechanical discontinuities (fault surfaces) in the subsurface. As an example, a structural model may include some information about one or more topological relationships between surfaces (e.g. fault A truncates fault B, fault B intersects fault C, etc.).

As to the one or more boundary representations 332, they may include a numerical representation in which a subsurface model is partitioned into various closed units representing geological layers and fault blocks where an individual unit may be defined by its boundary and, optionally, by a set of internal boundaries such as fault surfaces.

As to the one or more structured grids 334, it may include a grid that partitions a volume of interest into different elementary volumes (cells), for example, that may be indexed according to a pre-defined, repeating pattern. As to the one or more unstructured meshes 336, it may include a mesh that partitions a volume of interest into different elementary volumes, for example, that may not be readily indexed following a pre-defined, repeating pattern (e.g., consider a Cartesian cube with indexes I, J, and K, along x, y, and z axes).

As to the seismic velocity modeling 351, it may include calculation of velocity of propagation of seismic waves (e.g., where seismic velocity depends on type of seismic wave and on direction of propagation of the wave). As to the seismic processing 352, it may include a set of processes allowing identification of localization of seismic reflectors in space, physical characteristics of the rocks in between these reflectors, etc.

As to the facies and petrophysical property interpolation 353, it may include an assessment of type of rocks and of their petrophysical properties (e.g. porosity, permeability), for example, optionally in areas not sampled by well logs or coring. As an example, such an interpolation may be constrained by interpretations from log and core data, and by prior geological knowledge.

As to the flow simulation 354, as an example, it may include simulation of flow of hydro-carbons in the subsurface, for example, through geological times (e.g., in the context of petroleum systems modeling, when trying to predict the presence and quality of oil in an un-drilled formation) or during the exploitation of a hydrocarbon reservoir (e.g., when some fluids are pumped from or into the reservoir).

As to geomechanical simulation 355, it may include simulation of the deformation of rocks under boundary conditions. Such a simulation may be used, for example, to assess compaction of a reservoir (e.g., associated with its depletion, when hydrocarbons are pumped from the porous and deformable rock that composes the reservoir). As an example a geomechanical simulation may be used for a variety of purposes such as, for example, prediction of fracturing, reconstruction of the paleo-geometries of the reservoir as they were prior to tectonic deformations, etc.

As to geochemical simulation 356, such a simulation may simulate evolution of hydrocarbon formation and composition through geological history (e.g., to assess the likelihood of oil accumulation in a particular subterranean formation while exploring new prospects).

As to the various applications of the applications block 340, the well prognosis application 342 may include predicting type and characteristics of geological formations that may be encountered by a drill-bit, and location where such rocks may be encountered (e.g., before a well is drilled); the reserve calculations application 344 may include assessing total amount of hydrocarbons or ore material present in a subsurface environment (e.g., and estimates of which proportion can be recovered, given a set of economic and technical constraints); and the well stability assessment application 346 may include estimating risk that a well, already drilled or to-be-drilled, will collapse or be damaged due underground stress.

As to the operational decision block 360, the seismic survey design process 361 may include deciding where to place seismic sources and receivers to optimize the coverage and quality of the collected seismic information while minimizing cost of acquisition; the well rate adjustment process 362 may include controlling injection and production well schedules and rates (e.g., to maximize recovery and production); the well trajectory planning process 363 may include designing a well trajectory to maximize potential recovery and production while minimizing drilling risks and costs; the well trajectory planning process 364 may include selecting proper well tubing, casing and completion (e.g., to meet expected production or injection targets in specified reservoir formations); and the prospect process 365 may include decision making, in an exploration context, to continue exploring, start producing or abandon prospects (e.g., based on an integrated assessment of technical and financial risks against expected benefits).

Figure 4:
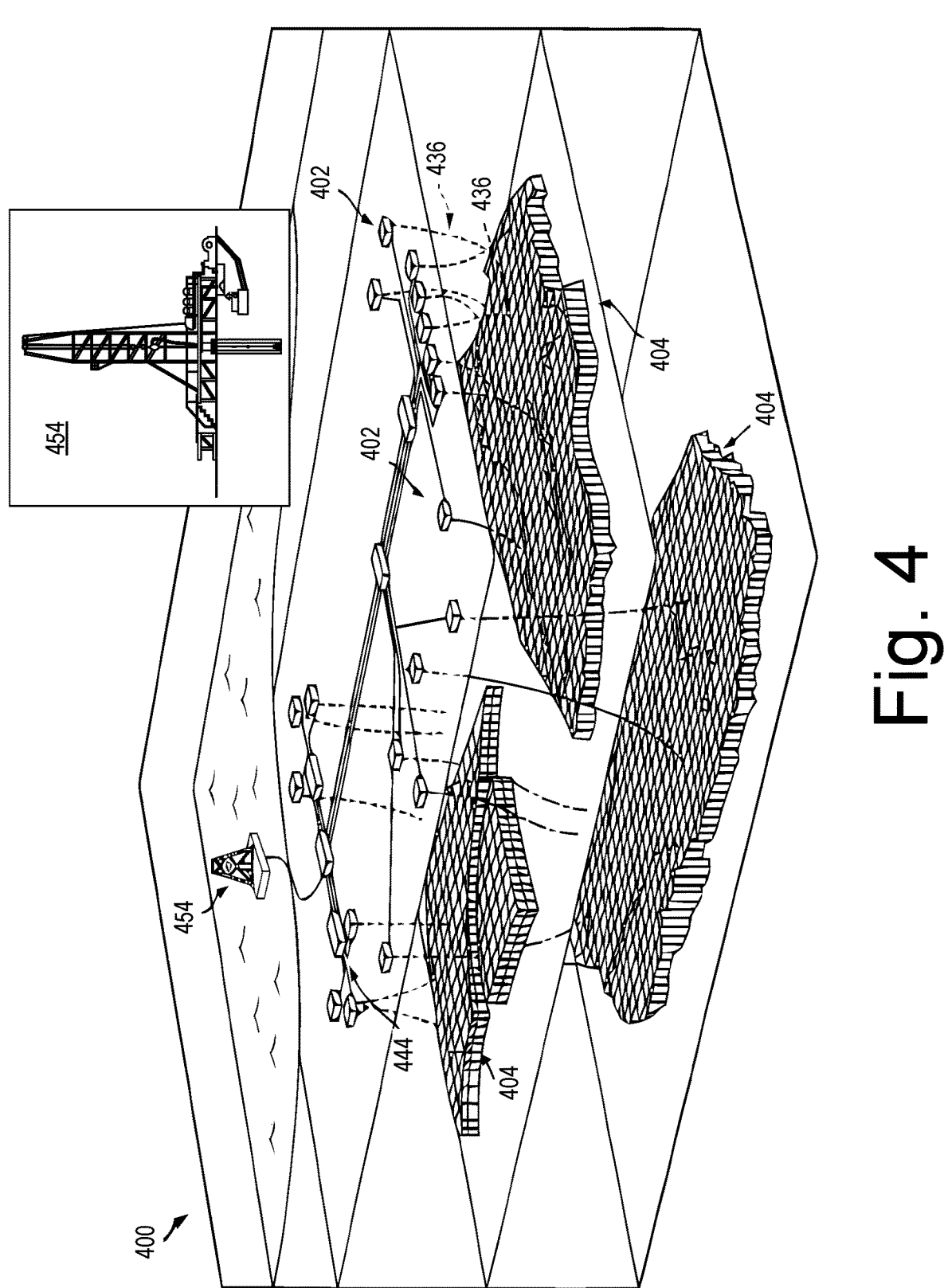
FIG. 4 illustrates examples of systems.

FIG. 4 shows an example of a geologic environment 400 as including various types of equipment and features. As shown, the geologic environment 400 includes a plurality of wellsites 402, which may be operatively connected to a processing facility. In the example of FIG. 4, individual wellsites 402 can include equipment that can form individual wellbores 436. Such wellbores can extend through subterranean formations including one or more reservoirs 404. Such reservoirs 404 can include fluids, such as hydrocarbons. As an example, wellsites can draw fluid from one or more reservoirs and pass them to one or more processing facilities via one or more surface networks 444. As an example, a surface network can include tubing and control mechanisms for controlling flow of fluids from a wellsite to a processing facility. In the example of FIG. 4, a rig 454 is shown, which may be an offshore rig or an onshore rig. As an example, a rig can be utilized to drill a borehole that can be completed to be a wellbore where the wellbore can be in fluid communication with a reservoir such that fluid may be produced from the reservoir.

Figure 5:
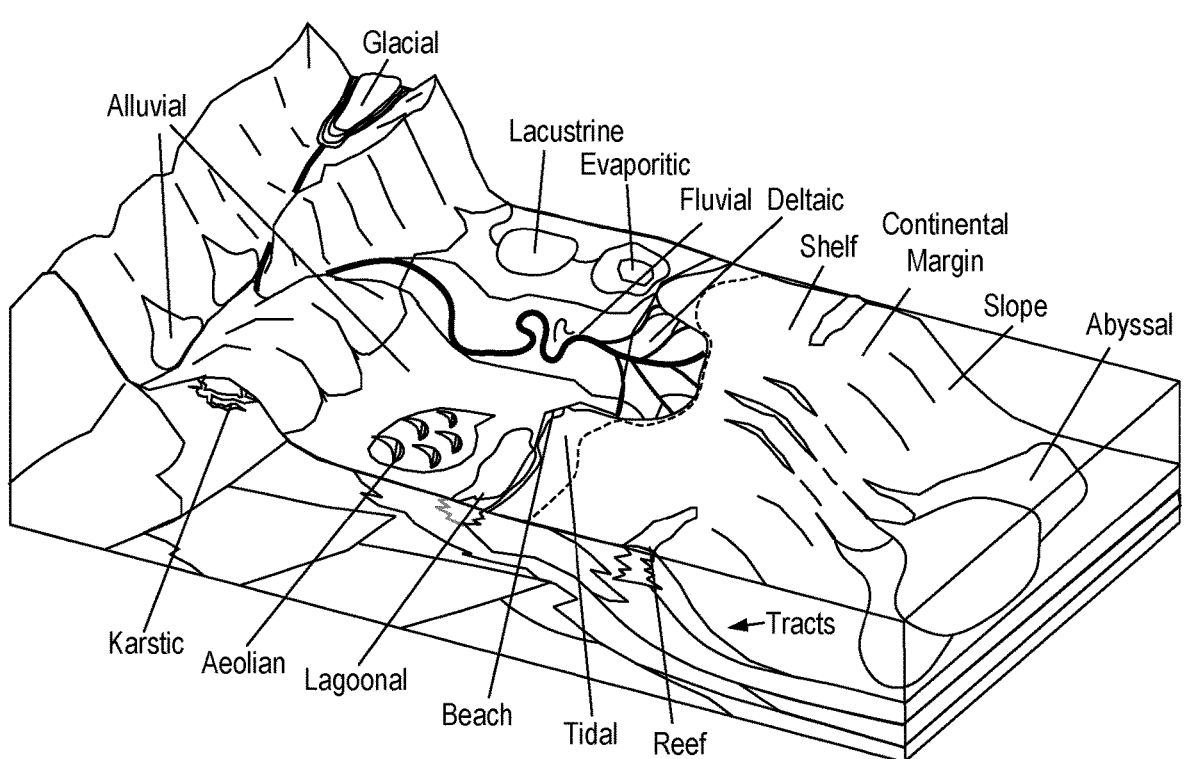
FIG. 5 illustrates an example of a graphic of depositional environments renderable to a graphical user interface.

FIG. 5 shows a diagram of examples of various depositional environments 500. A depositional environment or sedimentary environment describes the combination of physical, chemical and biological processes associated with the deposition of a particular type of sediment and, thus, rock types that can be formed after lithification, if the sediment is preserved in the rock record.

As an example, a method or methods may aim to match environments associated with particular rock types or associations of rock types to one or more existing analogues. However, the further back in geological time sediments were deposited, the more likely it may become that one or more direct modern analogues are not available.

Depositional environments may be classified using various descriptors such as, for example, continental, transitional, marine and other.

As to continental, it can include alluvial, a type of fluvial deposit, that is caused by moving water in a fan shape (e.g., alluvial fan) and containing impermeable and nonporous sediments that tend to be well sorted. Another continental type is Aeolian, which is due to wind activity. For example, wind activity can be seen in deserts and coastal regions and well sorted, large scale cross-beds. Yet another continental type is fluvial, as mentioned, due to processes associated with moving water, mainly streams, where common sediments can include gravel, sand, and silt. Another continental type lacustrine, which is also due to processes associated with moving water, mainly lakes, where common sediments can include sand, silt, and clay.

As to transitional, it can include deltaic, which is characterized by a silt deposition landform at the mouth of a river (e.g., possible cross beds, ripple marks) where common sediments can include sand, silt, and clay. Another type of transitional is tidal, due to processes associated with tidal currents, which can create tidal flats (e.g., fine-grained, ripple marks, cross-beds) where common sediments can include silt and clay. Yet another type of transitional is lagoonal, which can be associated with a shallow body of water separated from a larger body of water, for example, by barrier islands or reefs. In various instances, little transportation creates a lagoon bottom environment. Common sediments can include carbonates (e.g., in tropical climates). Another type of transitional is beach, which can be an area of loose particles at the edge of the sea or other body of water. A beach can be caused by waves and longshore currents. Processes can create beaches, spits, and sandbars with common sediments of gravel and sand. Yet another type of transitional is lake, which is a large body of relatively still water.

As to marine, a shallow water marine environment can be due to processes associated with waves and tidal currents, which can create shelves and slopes, and/or lagoons. Common sediments can include carbonates (e.g., in tropical climates) or sand, silt, and clay (e.g., non-tropical). A marine type can be an upper shoreface, which is a portion of the seafloor that is shallow enough to be agitated by everyday wave action, and another marine type can be a lower shoreface, which is a portion of the seafloor, and the sedimentary depositional environment, that lies below the everyday wave base. Yet another marine type can be a deep water marine environment, which can be a flat area on a deep ocean floor (e.g., abyssal plains) caused by ocean currents where common sediments can include clay, carbonate mud, and silica mud. Another marine type is reef, which can be a shoal of rock, sand, coral or similar material, lying beneath the surface of water caused by waves and tidal currents, which may also create one or more adjacent basins. Common reef sediments include carbonates.

As to others, consider evaporite, which is a water-soluble mineral sediment formed by evaporation from an aqueous solution and consider glacial, which can include till, which is angular to rounded grains, poorly sorted, unstratified (e.g., massive) and outwash, which can include ripple marks and/or cross-beds, similar to stream channels. Yet others include volcanic and tsunami, which is a sedimentary unit deposited by a tsunami.

Depositional environments in ancient sediments may be recognized by using a combination of one or more of sedimentary facies, facies associations, sedimentary structures and fossils, particularly trace fossil assemblages, as they can indicate the environment in which organisms lived.

As an example, a geologic environment may be characterized with respect to one or more system tracts. For example, consider a systems tract as a sequence subdivision that includes one or more depositional units that may differ in geometry from another systems tract.

As an example, different systems tracts may represent different phases of eustatic changes. Eustasy pertains to sea level and its variations. Thus, eustatic changes may pertain to sea level changes, which may result, for example, from movement of tectonic plates that alter volume of an ocean basin, from climate effects on volume of water stored in glaciers/icecaps, etc. Eustasy can affect positions of shorelines and processes of sedimentation, which can make interpretation of eustasy a useful aspect of sequence stratigraphy.

As an example, a lowstand systems tract (LST) may develop during times of relatively low sea level; a highstand systems tract (HST) may develop at times of high sea level; and a transgressive systems tract (TST) may develop at times of changing sea level.

A lowstand systems tract (LST) may be a systems tract overlying a sequence boundary (SB) and overlain by a transgressive surface (TS). A lowstand systems tract (LST) may be characterized by a progradational to aggradational parasequence set. As an example, a lowstand systems tract (LST) may be a basin-floor fan, a slope fan, a lowstand wedge, etc.

A highstand systems tract (HST) may be a systems tract bounded below by a downlap surface (DS) and above by a sequence boundary (SB). A highstand systems tract (HST) may be characterized by an aggradational to progradational parasequence set.

As an example, retrogradation may be characterized by accumulation of sequences by deposition in which beds are deposited successively landward, for example, where sediment supply may be limited and unable to fill available accommodation. For example, the position of a shoreline may migrate backward onto land, a process called transgression, during episodes of retrogradation.

As an example, aggradation may be characterized by accumulation of stratigraphic sequences by deposition that stack beds atop one another, for example, building upwards during periods of balance between sediment supply and accommodation.

As an example, progradation may be characterized by accumulation of sequences by deposition in which beds are deposited successively basinward, for example, where sediment supply exceeds accommodation. For example, the position of a shoreline may migrate into a basin during episodes of progradation (e.g., regression).

Figure 6:
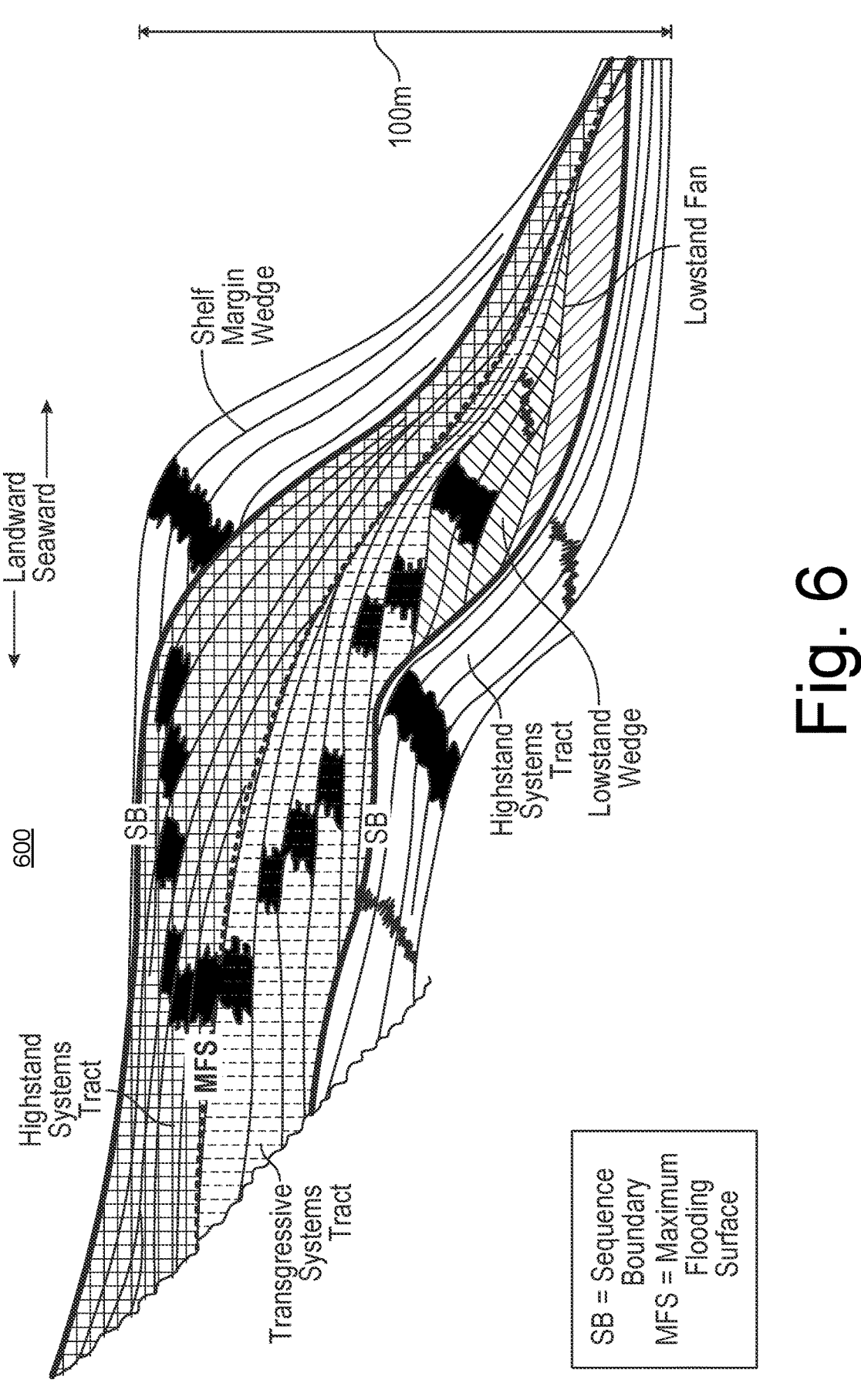
FIG. 6 illustrates an example of a graphic of systems tracts renderable to a graphical user interface.

FIG. 6 shows an example of a graphic 600 with respect to sequence stratigraphy identification. The graphic 600 shows examples of some types of sequence boundaries, one or more HSTs, a transgressive systems tract (TST), a shelf margin wedge, a lowstand fan, lowstand wedge, etc.

As shown in FIG. 5 and FIG. 6, various types of depositional environments may be associated various physical processes that generated gross sediment geometric end members, which include sequences, systems tracts, and parasequences.

As explained, a sequence can be a group of relatively conformable strata that represent a cycle of deposition that is bounded by unconformities or correlative conformities and can form a unit of interpretation in sequence stratigraphy where a sequence can include a systems tract. A parasequence can be a relatively conformable depositional unit bounded by surfaces of marine flooding, surfaces that separate older strata from younger and show an increase in water depth in successively younger strata. A parasequence tends to be thin, which may make detection using seismography more difficult; however, when present as a set of parasequences, detection can be easier.

As explained, with a shoreline may define a landward side and a seaward side. A shoreline may exist at present time or a shoreline may have existed prior to present time. As an example, a number of abyssal basins on both sides of the Mid-Atlantic Ridge and bounded by east-west fractures that hold substantial thickness of sedimentation and hydrocarbon-rich black shales. Various abyssal basin plains are at water depths of approximately 4 km to 5 km. For example, three extensive hydrocarbon deposits have been found in 4 km deep abyssal plains off the northwestern coast of Africa. Investigation by seismic acquisition vessels determined that sequences found during coring conducted in the Gambia Basin extended throughout the basin and were found in similar depths in other basins located along the equatorial Atlantic. Hydrocarbon deposits lie in an area of complex terrain surrounding the Mid-Atlantic Ridge, which is displaced eastward 3700 km with the aid of numerous lateral east-west transform faults. These transform faults or fractures divide up the abyssal areas into basins, with Gambia and Sierra Leone in the east and Ceara and Demerara in the west. During the Early Cretaceous (110 million years ago), water transfer between the two adjacent continents was restricted by shallow fracture zones where, under a tropical environment, conditions were favorable for accumulation of organic matter.

Relatively deep reserves also exist below the pre-salt layer, which is a diachronous series of geological formations on the continental shelves of extensional basins formed after the break-up of Gondwana, characterized by the deposition of thick layers of evaporites, mostly salt. Some of the petroleum that was generated from sediments in the pre-salt layer has not migrated upward (e.g., salt dome formation) to the post-salt layers above. Such features can be found off the coast of Africa and Brazil. Oil and natural gas reserves lie below an approximately 2 km thick layer of salt, itself below in places more than 2 km of post-salt sediments, in water depths between approximately 2 km and 3 km in the South Atlantic. Drilling through the rock and salt, especially in such deep water environments, can be technologically complex and resource intensive.

Where a geologic environment is at a considerable depth, whether onshore and/or offshore, an analogue or analogues may be sought to understand better the geologic environment. For example, consider a study by Freire et al. (Searching for Potential Analogues for the Pre-Salt Santos Basin, Brazil: High-Resolution Stratigraphic Studies of Microbialite-Bearing Successions from Salta Basin, Argentina, AAPG International Conference & Exhibition, January 2011), which examined outcrops of the Salta Basin as an analogue to pre-salt reservoirs offshore Brazil. In particular, microbialite successions were utilized as input for production zoning, predictability of reservoir facies and geocellular modeling of carbonate reservoirs of microbial origin from the Pre-Salt Santos Basin.

The Salta Basin is a sedimentary basin located in the Argentine Northwest that started to accumulate sediments in the Early Cretaceous (Neocomian) and at present has sedimentary deposits reaching thicknesses of 5 km. The basin developed under conditions of extensional tectonics and rift-associated volcanism. An outcrop is a body of rock exposed at the surface of the Earth. Thus, some analogues of a region of interest can be relatively easy to examine when compared to the region of interest. While the foregoing example of the Pre-Salt Santos Basin and the Salta Basin may be quite extreme in terms of accessibility, locating an analogue that already has core and/or other data and/or that is more accessible and/or otherwise less complex to explore can be beneficial.

Referring to the system 300 of FIG. 3, the geological data 310 can include the outcrop interpretation data 316 or, it may not. Various types of data may be available or become available for one or more analogues. In the system 300, an analogue framework may be utilized to find and/or assess one or more analogues.

As explained, geoscientists often seek comparisons for predicting and/or propagating information to areas where a lesser amount of information exists. As an example, a framework may help in discovering analogues based on properties or meta properties. In such an example, the framework may be operable without a-priori knowledge. For example, consider a framework where a user can navigate (e.g., travel across, etc.) geological information without supplying one or more pre-requisites. As an example, a framework may utilize virtual distances, which may be weighted, between objects using meta-data; noting that for some geological criteria, a quantitative approach is not always possible to determine how close or distant some items are with regards to specific (dis-)similarity parameters.

As an example, a framework can include one or more virtual and/or actual distance metrics and/or may generate one or more virtual and/or actual distance metrics. As an example, a framework can include and/or generate a distance data structure, which may be, for example, in the form of a table.

As an example, a framework may be a prospect analysis framework, where a prospect can be a region of interest, which may be an area of exploration in which hydrocarbons have been predicted to exist with some certainty as to recoverability. As an example, a prospect may be an anomaly, such as a geologic structure or a seismic amplitude anomaly, that may be recommended by one or more explorationists for drilling a well. Justification for drilling a prospect may be made by assembling evidence for an active petroleum system, or reasonable probability of encountering reservoir-quality rock, a trap of sufficient size, adequate sealing rock, and appropriate conditions for generation and migration of hydrocarbons to fill the trap. As an example, a group of prospects of a similar nature can form a play.

As to an example of a virtual distance data structure, consider geometric series based virtual distances. As an example, consider a series of Fibonacci numbers; noting that some geometric series are Fibonacci series or sequences (e.g., Fibonacci numbers). As an example, a Fibonacci sequence may be described as a projection of a two-dimensional geometric sequence. An article by Cui et al., "The Fibonacci-type sequence revisited: A Geometric Progression", Far East Journal of Mathematical Sciences (FJMS), Volume 106, Number 2, 2018, Pages 267-278 (http://dx.doi.org/10.17654/MS106020267), is incorporated by reference herein. And, MathWorld—A Wolfram Web Resource by Chandra et al., "Fibonacci Number", describes various aspects of Fibonacci numbers (https://mathworld.wolfram.com/FibonacciNumber.html).

The Fibonacci numbers are the sequence of numbers $$\{F_n\}_{n=1}^{\infty}$$

defined by the linear recurrence equation:

$$F_n = F_{n-1} + F_{n-2}$$

with $F_1 = F_2 = 1$. As a result of the foregoing definition, the following definition can be utilized $F_0 = 0$.

The Fibonacci numbers for n=1, 2, . . . are 1, 1, 2, 3, 5, 8, 13, 21, . . . (The On-Line Encyclopedia of Integer Sequences (GEIS) A000045). A Fibonacci sequence may be referred to as Lamé's sequence and a Fibonacci sequence may be related to a Lucas sequence (e.g., $U_n(1, -1)$). Fibonacci numbers may be viewed as a particular case of the Fibonacci polynomials $F_n(x)$ with $F_n=F_n(1)$. Fibonacci numbers are implemented in the Wolfram Language as Fibonacci[n].

In nature, various processes can be defined using Fibonacci numbers. For example, consider branching in trees, the arrangement of leaves on a stem, the fruit sprouts of a pineapple, the flowering of an artichoke, an uncurling fern, and the arrangement of a pine cone's bracts.

The golden ratio can be expressed with Fibonacci numbers, for example:

$$\phi = 1 + \sum_{n=1}^{\infty} \frac{(-1)^{n+1}}{F_n F_{n+1}}$$

The golden ratio, also known as the divine proportion, golden mean, or golden section, is a number that can be encountered when taking the ratios of distances in geometric figures such as the pentagon, pentagram, decagon and dodecahedron.

FIG. 7 shows an example of a graphic 700 that characterizes relationships between various environments, including various environments as in the various depositional environments 500 of FIG. 5. While the graphic 700 can be multidimensional with a number of dimensions greater than two, in FIG. 7, a 2D representation is presented, which may be part of a graphical user interface (GUI) that can include search functionality. The graphic 700 can be part of a geological analogue search framework. With reference to FIG. 5, some aspects of the various depositional environments 500 can be spatially associated with some of the environments in the graphic 700. For example, consider the glaciolacustrine node (labeled with numeral 25) and the glaciolacustrine depositional environment, both of which can be generally elevated above the abyssal plain node (labeled with numeral 5) and the abyssal plain depositional environment. As another example, consider various nodes and depositional environments that are generally at elevations between the mountainous depositional environments and the sea bed depositional environments. As shown, a graphic in a geological analogue search framework can provide some degree of physical meaning, which may assist in searching, understanding, navigating, etc., various types of data, which can include analogue data.

FIG. 8 shows an example graphic 810 and an example graphic 830 showing various Fibonacci numbers. In the graphic 810, blocks are illustrated for the following Fibonacci numbers 1, 1, 2, 3, 5, 8, 13 and 21 along with an inscribed spiral. In the graphic 830, genetic male/female graphics are shown for six generations where the number of possible ancestors on the X chromosome line at generation n can be represented by Fibonacci numbers. For example, for the six generations shown, the Fibonacci numbers are 1, 1, 2, 3, 5 and 8.

As an example, a virtual distance can be a Fibonacci number or based on a Fibonacci number. As an example, in a natural environment such as, for example, the depositional environments 500, various features may be associated using Fibonacci numbers.

As another example, consider accessing a paleobiology database that includes taxonomic names and associated data. For example, consider the Paleobiology Database data model as provided by Peters et al., The Paleobiology Database application programming interface, Paleobiology, 42(1), pp. 1-7 (2016), which is accessible via an application programming interface (API). Taxonomic names returned by the Neotoma databases reflect a static taxonomy as determined by taxonomic experts. The Earthlife Consortium (ELC) API returns for a given taxon that includes each database's understanding of what is contained in the given taxon. The ELC provides paleontological and paleoecological databases with a common HTTP API interface.

The ELC API includes, for example, bbox= POLYGON(( . . . )), which provides a geographic bounding box for constraining a response where the bounding box can be formatted using a OGC WKT Polygon; noting that the OpenStreetMap WKT Playground may be useful in graphically creating a polygon. As another example, consider agerange=geologic_age,[value,value][geologic_age|value], which is an API call for a single named geologic age or a comma-separated pair of numerical ages, geologic ages or a combination of the two. In such an example, returned ages reflect the minimum and maximum from the pairwise set. The ELC API can operate using a taxon, bbox or agerange parameter; noting that more than one of these may be used together to further constrain a query. As to ageunits=ybp|ka|ma, units of geologic age can be used in a query where age values are passed via the API can be interpreted in the context of this parameter. Time specific returned values can be converted to match this parameter (e.g., type: str.; default: "Ma"). As to age, it can be stored as a string that can be converted into a numeric absolute age. As to coordtype=modern|paleo, a system may configure the type of Cartesian coordinates to be included in the response. Various resource databases store geography of occurrences and other data objects using modern day coordinates; however, in most instances, the API is able to convert the coordinates in to a historical projection (e.g., type: str.; default: "modern"). As to output, the ELC API provides output=json|csv, which controls the file format of the data return, which can be, for example, serialized JSON or tabular CSV. A meta-data block can be a separate JSON object (e.g., not included in the CSV file).

As to a depositional environment, it can utilize a string structure. As an example, a virtual distance can be constructed to structure depositional environments. As an example, a virtual distance can represent a type of similarity between one depositional environment and one or more other depositional environments. As to virtual distances, a geographical distance can be an example of a virtual distance that has some physical meaning and/or a lithological distance can be an example of a virtual distance that has some physical meaning.

As an example, a system can include one or more processors; memory accessible to at least one of the one or more processors; processor-executable instructions stored in the memory and executable to instruct the system to: responsive to receipt of a search instruction related to a geographic location or geological context, accessing a data structure for subsurface geologic regions categorized at least in part according to parameters that describe depositional environments (e.g., and/or one or more other geological properties, such as lithological content/proportions, etc.), where the data structure includes virtual distances between the parameters; generating a search result using the search instruction and the data structure, where the search result represents an organization of at least a portion of subsurface geologic regions as closest analogues of the geographic location; and transmitting search result information for graphically rendering the search result to a display as part of an interactive graphical user interface.

FIG. 9 shows an example of a data structure 900 that includes various depositional environments and associated virtual distances. For example, an open marine depositional environment can be quite similar to a deep marine slope depositional environment such that the virtual distance is unity (1) while a fluvial depositional environment can be quite dissimilar to an open marine depositional environment such that the virtual distance is 89. Somewhere between those two can be a shallow marine shelf depositional environment such that, with respect to an open marine depositional environment, a virtual distance can be 34. The data structure 900 provides for representing depositional environments in a manner that can facilitate searching as well as visual representations of search results, which, depending on parameter space, parameter dimensions, etc., may have some physical association with deposition environments, for example, as arranged in the example of FIG. 5. For example, the graphic 700 of FIG. 7 includes virtual distances of the data structure 900 such that some amount of correspondence can be seen between the graphic 700 and the depositional environments 500. In such an approach, there can be some correspondence between virtual distance and actual distance (e.g., relative to geological processes, etc.). The graphic 700 of FIG. 7 can be a graph representation of depositional environments constructed using virtual distances that are based on Fibonacci numbers that can construct a geographical distance matrix or data structure such as the data structure 900 of FIG. 9. As an example, analogues can be stored in a database with entries for such data.

In the example of FIG. 9, the data structure 900 can be a portion of a data structure as the number of columns and rows can be equal. As to a series of Fibonacci numbers, consider, for example, n ranging from 0 to an upper integer value (e.g., as suitably selected for generation of a number of virtual distances) and corresponding Fibonacci numbers for each value of n such as, for example: 0, 1, 1, 2, 3, 5, 8, 13, 21, 34, 55, 89, 144, 233, 377, 610, etc. Such a series or one or more portions thereof can be utilized for virtual distances between depositional environments (e.g., using lithological and/or geographical assessments, etc.).

As an example, assessments may be based on factors such as, for example, grain size, sortedness, energy, etc. As to some examples, consider glacial as being arenites with pebbles from till, moraines, drumlins; glaciofluvial as being arenites with pebbles from outwash plain, Esker, outwash delta/fan; glaciolacustrine as being poorly sorted like till, varves; lacustrine as being low energy particles size, well sorted (silt and clays highly laminated), occasionally carbonates, oil gas, uranium, strontium; lacustrine delta as being similar to river dominated deltas (fine grained to coarse deposits, gravelly fan); estuarine as being fine grained (clay silt) from brackish water (mix of marine and fluvial particles), high organic matter (o.m.)., finer than deltaic deposits; fluvial as being sandstones channel (point bar), levee, muddy backswamp; delta plain as being alluvial dep; alluvial as being floodplains, deltas, banks overflow; desert as being dunes, dry lake (Halite, gypsum, borax), flash floods; Eolian as being dunes, loess; evaporite basin as being calcite, gypsum, anhydrite, halite, potassium and magnesium salt; marine delta as being fluvial channels (incised valley), coarse topsets, sandy foresets, silty bottom sets, sandy mouth bars; marine delta front as being sandstone, siltstone, part of a delta that faces a mix of fluvial and marine processes; shoreline as being sand, blocks, Hummocky cross-stratification (HCS); supratidal as being sabkha, desiccation cracks, silty clay with roots, wood debris and burrows; subaerial as being sabkha, desiccation cracks, silty clay with roots, wood debris and burrows; intertidal as being cross laminated sandstones, flaser, mudstones; subtidal as being sandy mud and silt interlaminated, few burrows, ripple bedding, cross bedding; shallow marine as being carbonate or siliciclastic, coarse grains, sometimes evaporites (gypsum and anhydrite), cross stratifications, desiccation cracks, stromatolites; shallow marine shelf as being sandy bar shoal, coarse organic carbonates (skeletons), $CaCO_3$ precipitate; restricted marine as being washover (sandy) in the muddy rich lagoon, tidal channel, cross bedding, marsh, lagoon, tidal flat (sand lenses), tidal delta (sand); marine shelf as being HCS for storm dominated, burrowed shelf mud, packestone/wackestone carbonate, tempestite; deep marine shelf as being clay, shale, chalk mudstone carbonate, slump, tempestite; deep marine slope as being slump, turbidites of detrical elements; deep marine trench as being accretion prism; deep marine as being turbidites, contourites, pelagic sediments, diatoms and radiolarian opal, carbonate from foram and cocolithophorids (chalk); open marine as being pelagic (ooze above calcite compensation depth (CCD)), biogenous (pellets, diatoms and radiolaria tests), silty contourite; and abyssal plain as being flat area with clastic from tubitites or contourites, carbonated mudstone with foram accumulation.

As an example, a data structure with virtual distances can correspond to a combination of geological (e.g., predominantly lithology) and geographical distance following a representation of a continental to deep marine depositional continuum (e.g., with its clastic and carbonated variants). The data structure 900 of FIG. 9 shows effectiveness of using geological meta-data associated with a graph search representation as part of an analogue finder. As an example, a data structure can correlate depositional environment poles in a multidimensional representation using, for example, a graph approach (see, e.g., the graphic 700 of FIG. 7).

As explained, a Fibonacci series can provide a representation of a classic continental to deep marine depositional continuum that can include a platform shape. Such an approach can be applied to one or more different types of data, for example, using several combinations of meta-data (e.g., facies, bio-forms such as foraminifera, chronostratigraphy, lithostratigraphy names, reservoir properties, production data, etc.).

The graphic 700 of FIG. 7 can be a graph search translation of a depositional environment data structure, which may be in the form of a matrix.

As an example, a system can provide for quantified and weighted metadata expressed in a graph search tool that allows a user to build and visualize relationships between geological items (e.g., depositional environments, etc.), and thus find analogues based at least in part on a qualitative approach. As an example, meta-data associations may be of various natures depending on a domain goal. The representation in a graph form may thus vary for a common geological data bucket, and offer different perspectives of the same data (e.g., domain prism in use to qualify these data).

While depositional environments are illustrated for an example data structure and example graph, additionally or alternatively, one or more other types of meta-data (e.g., reservoir potential, production rates, etc.) may be utilized. As explained, meta-data may be associated together to describe and link data of interest.

As explained, virtual distances may be based on a suitable series such as, for example, a Fibonacci series (e.g., or sequence). As illustrated and explained, a search system can provide a graph search tool that can offer a user a "travel experience", which may be supplemented by and/or integrated with one or more other graphics, tables, etc. For example, a graph search tool can allow a user to travel across data in a manner that can allow the user to understand relationships and uncover search results that may or may not have been understood to exist given a subsurface geologic region of interest (e.g., a target region).

As an example, a system can utilize a combination of types of relationships for various different aspects of a subsurface geologic region or regions. For example, as to lithology, content may be stored as unstructured strings. For example, consider one or more of lithology flags, merge synonyms, etc. As an example, lithologies can include terms such as sandstone, chalk, mudstone, clay, carbonate rock, siltstone, etc. In various instances, a data structure can be utilized that relates such terms. As an example, analogues can be stored in a database with entries for such data.

As an example, a system can utilize petrophysical information such as, for example, porosity, permeability, mineralogy mix, pore pressure, net-to-gross (NTG), etc. As an example, analogues can be stored in a database with entries for such data.

As an example, a system can utilize hydrocarbon type, which may be stored, for example, as unstructured strings where flags may be utilized. As an example, analogues can be stored in a database with entries for such data.

As an example, a system can perform clustering where, for example, various types of flags, values, distances, etc., may be utilized. For example, consider a system that can include one or more of flags: Lithologies_sandstone, Lithologies_shale, Lithologies_siltstone, Lithologies_limestone, Lithologies_sand, Lithologies_mudstone, Lithologies_coal, Lithologies_quartzose sandstone, Lithologies_chalk, Lithologies_silt, Lithologies_, HC Type_Gas,condensate, HC Type_Gas, HC Type_Oil,gas,cond, HC Type_Oil,gas, HC Type_Oil, Deposit Environment Type_, Deposit Environment Type_Eolian, Deposit Environment Type_Fluvial, Deposit Environment Type_Shallow marine, Deposit Environment Type_Shallow marine shelf, Deposit Environment Type_Marine delta, Deposit Environment Type_Deep marine, Deposit Environment Type_Open marine, Deposit Environment Type_Delta plain, etc. As to values, consider one or more of Young_Age, Old_Age, Porosity Max Pct, Permeab Max Md, Gross Thickn Max Val Meter, Net Thickn Max Val Meter. As to distances, consider one or more of actual distances and virtual distances.

Figure 10:
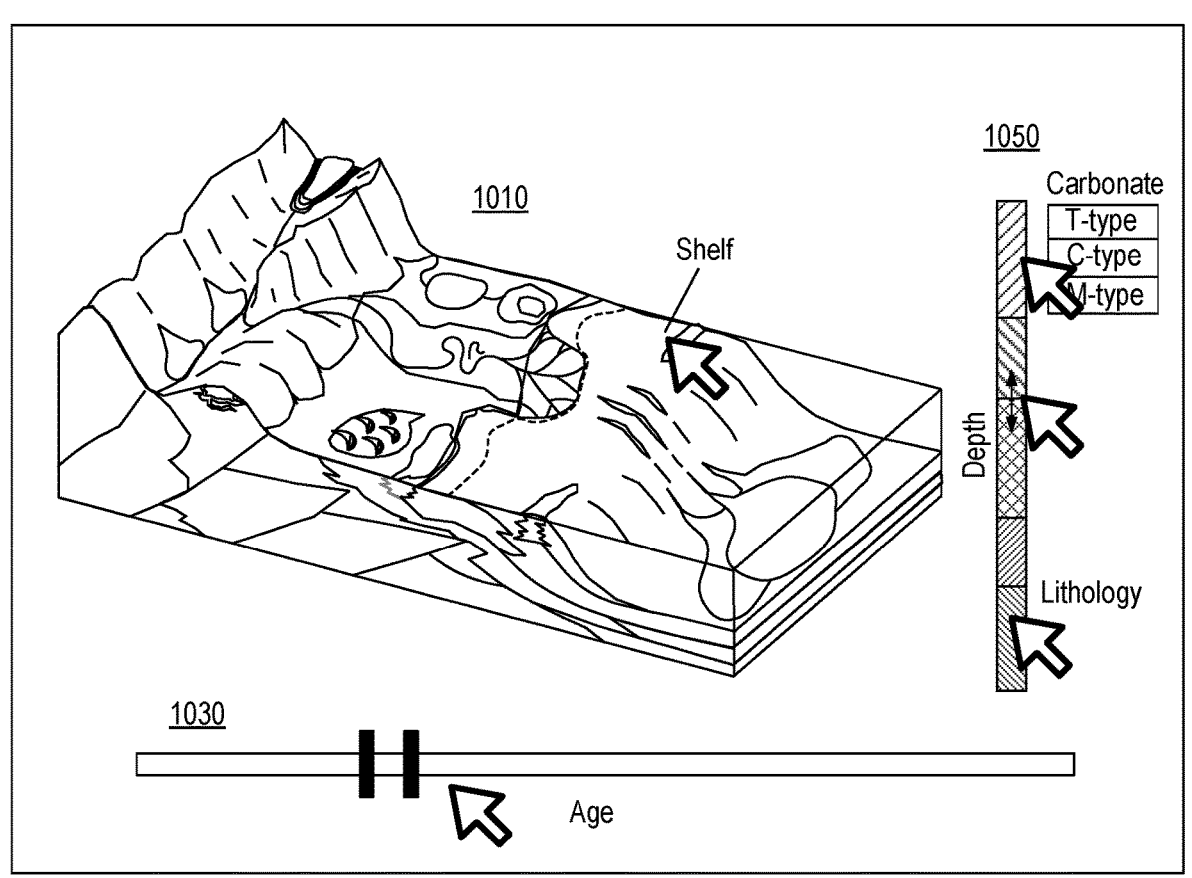
FIG. 10 illustrates an example of a graphical user interface.

FIG. 10 shows an example of a graphical user interface (GUI) 1000 that can include one or more graphical controls such as, for example, one or more of the graphical controls 1010, 1030 and 1050. In the example of FIG. 10, a user may select one or more of the graphical controls 1010, 1030 and 1050 to form a query or queries for a system, which may be issued via one or more API calls, etc.

As shown, a user can utilize a human input device (HID) such as a touch screen, a mouse, a touchpad, a stylus, a microphone, hand motion sensors, etc., to select a feature in the graphical control 1010 that represents various deposition environments. As to the graphical control 1030, a user can utilize a HID to select an age or an age range using one or more sliders, text input fields, etc. As to the graphical control 1050, it can represent criteria along a depth axis where various layers (e.g., stratigraphy) can be provided (e.g., lithology, facies, etc.), where a user may control a depth range, depth boundaries, formation type, lithology, etc. For example, consider a user selected the shelf as indicated by a cursor arrow where an approximately age range may be automatically adjusted to default values that can be customized by a user. In such an example, strata may be rendered with respect to depth where the user can customize one or more parameters of the strata. As mentioned system tracts may be utilized. As an example, for a marine shelf, consider a carbonate platform that may be further specified to be a T-type carbonate platforms (e.g., produced by tropical factories), a C-type carbonate platforms (e.g., produced by cool-water factories), or an M-type carbonate platforms (e.g., produced by mud-mound factories). As an example, a user may select a stratum to specify one or more lithological criteria.

As an example, the GUI 1000 may be utilized to formulate a query that may be a dynamic query that is issued to a search engine that generates search results that can be listed and/or visualized. Such search result may provide analogues where, for example, the analogues can be ranked with respect to relevance to a query.

In the example of FIG. 10, the GUI 1000 may be utilized to find one or more analogues for a subsurface geological region where at least some data (e.g., log data, imagery, etc.) exist. In such an example, a user can generate a query using at least a portion of the data such that one or more analogues are found using a search engine. As an example, search results may be provided in one or more types of formats. For example, consider a tabular format, a graphical format, etc.

Figure 11:
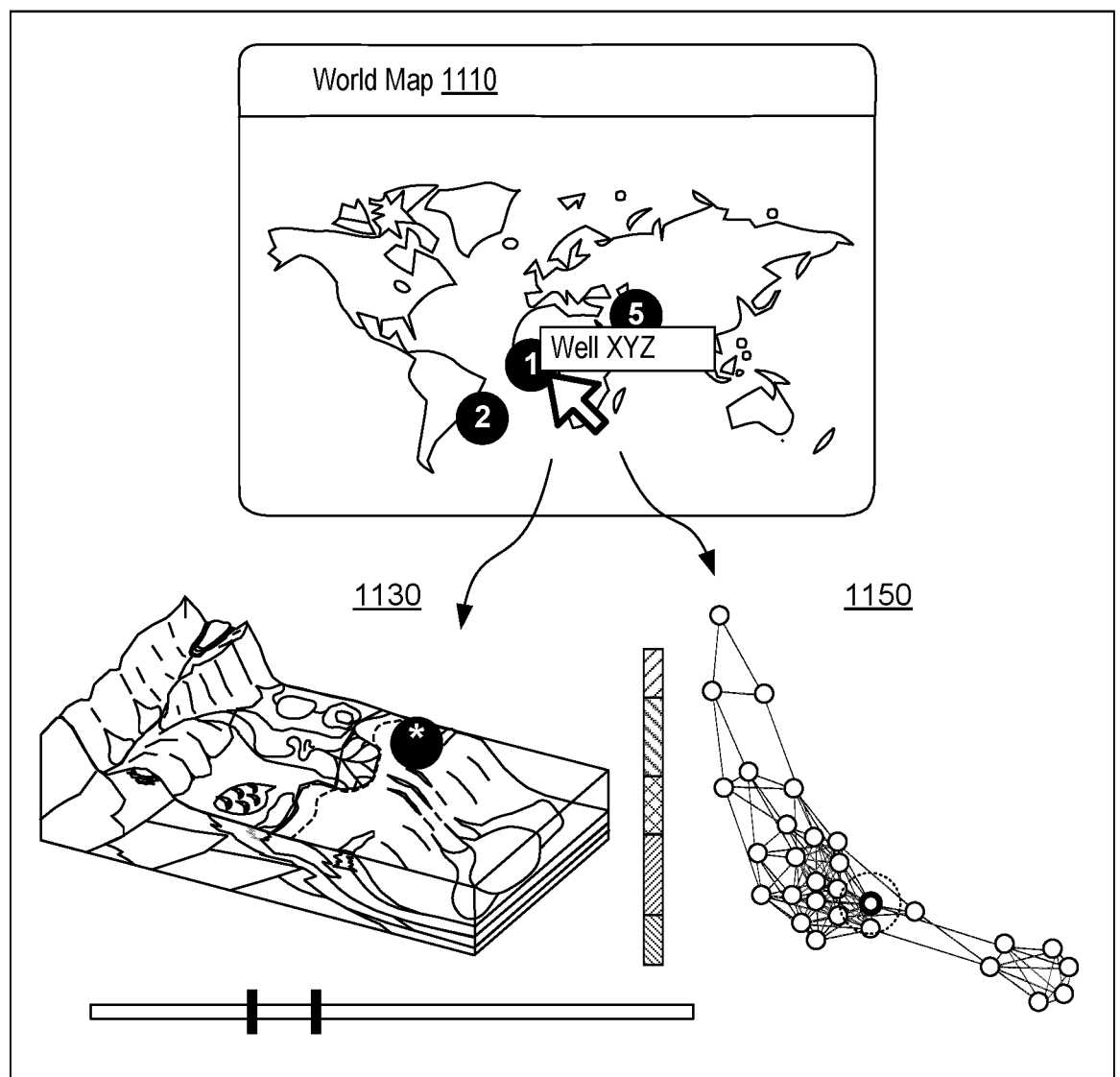
FIG. 11 illustrates an example of a graphical user interface.

FIG. 11 shows an example of a GUI 1100 that can include various sub-GUIs such as, for example, one or more of GUIs 1110, 1130 and 1150. As an example, search results may be represented in the GUI 1110 using a world map where circles, heat map colors, etc., indicate search results. In such an example, a user may utilize a HID to navigate the search results where, for example, upon selection of a search result, data associated with the search result can be rendered using one or more other GUIs such as, for example, the GUI 1130 and/or the GUI 1150. For example, the GUI 1130 may automatically adjust to the search result and the GUI 1150 may automatically identify the search result using a graphic such as the graphic 700 of FIG. 7 (see, e.g., shallow marine shelf as item number 2 in the graphic 700).

As mentioned, a GUI may be dynamic and, for example, linked to one or more other GUIs. For example, in the example of FIG. 11, a user may interact with one or more of the sub-GUIs 1110, 1130 and 1150 to cause further dynamic searching. For example, consider a user viewing the depth graphic of the GUI 1130 and adjusting one or more strata to automatically generate a query that is transmitted for generation of refined search results. In such an example, the user can dynamically search for analogues. As another example, consider a user zooming in on the GUI 1150, which may be manipulated in a multi-dimensional space. In such an example, a user may select "neighbor" node as being similar to cause refinement of a search. For example, in the data structure 900 of FIG. 9, the shallow marine shelf (SMS) is shown to have Fibonacci numbers of 1, 2, 3, 5, 8, 13, 21, 34, 55 and 89 as virtual distances to other depositional environments. As explained, the graphic 700 can be based at least in part on such virtual distances such that selection of a neighbor to the node for shallow marine shelf can cause searching for analogues that may be suitably similar to a user's target subsurface geologic region. For example, consider a user selecting the node for the restricted marine depositional environment (see, e.g., the node labeled 16 in the graphic 700 of FIG. 7). As can be appreciated, the labels of the nodes in the graphic 700 may or may not have physical meaning; whereas, the values in the data structure 900 of FIG. 9 can impart meaning (see, e.g., the closeness of the nodes labeled 2 and 16 in the graphic 700 of FIG. 7). In such an example, a user can, depending on the user's desire and/or knowledge, generate a search query (e.g., and/or refine a search query) using the graphic of the GUI 1150 and/or using the graphic of the GUI 1130. For example, if the user understands that a particular region of the graphic of the GUI 1130 corresponds to a restricted marine deposition environment, the user may select that region; however, if the user is not aware of that particular region, the user may readily select a node that is proximate to the shallow marine shelf node as highlighted in the graphic of the GUI 1150. Such a system can facilitate and expedite navigation of a large amount of data where a user desires finding one or more adequate analogues.

As explained, a system can include or be operably coupled to one or more GUIs (e.g., as rendered to one or more displays of one or more computing devices, etc.), to navigate depositional environments in an effort to find one or more suitable analogues. In such an approach, the user can be a geo-traveler that can readily explore subsurface geologic regions of the Earth, for example, to find one or more analogues of a target region. As explained, little information may be available for a target region and additional information may be time consuming and/or resource intensive to acquire. In such a scenario, an analogue or analogues can help the user (e.g., or team) to assess a target region and make one or more decisions as to taking one or more field operations in the target region and/or in one or more analogues regions. As explained, where an appropriate analogue is found, it may be more effective to drill into the analogue region than to drill into the target region.

Figure 12:
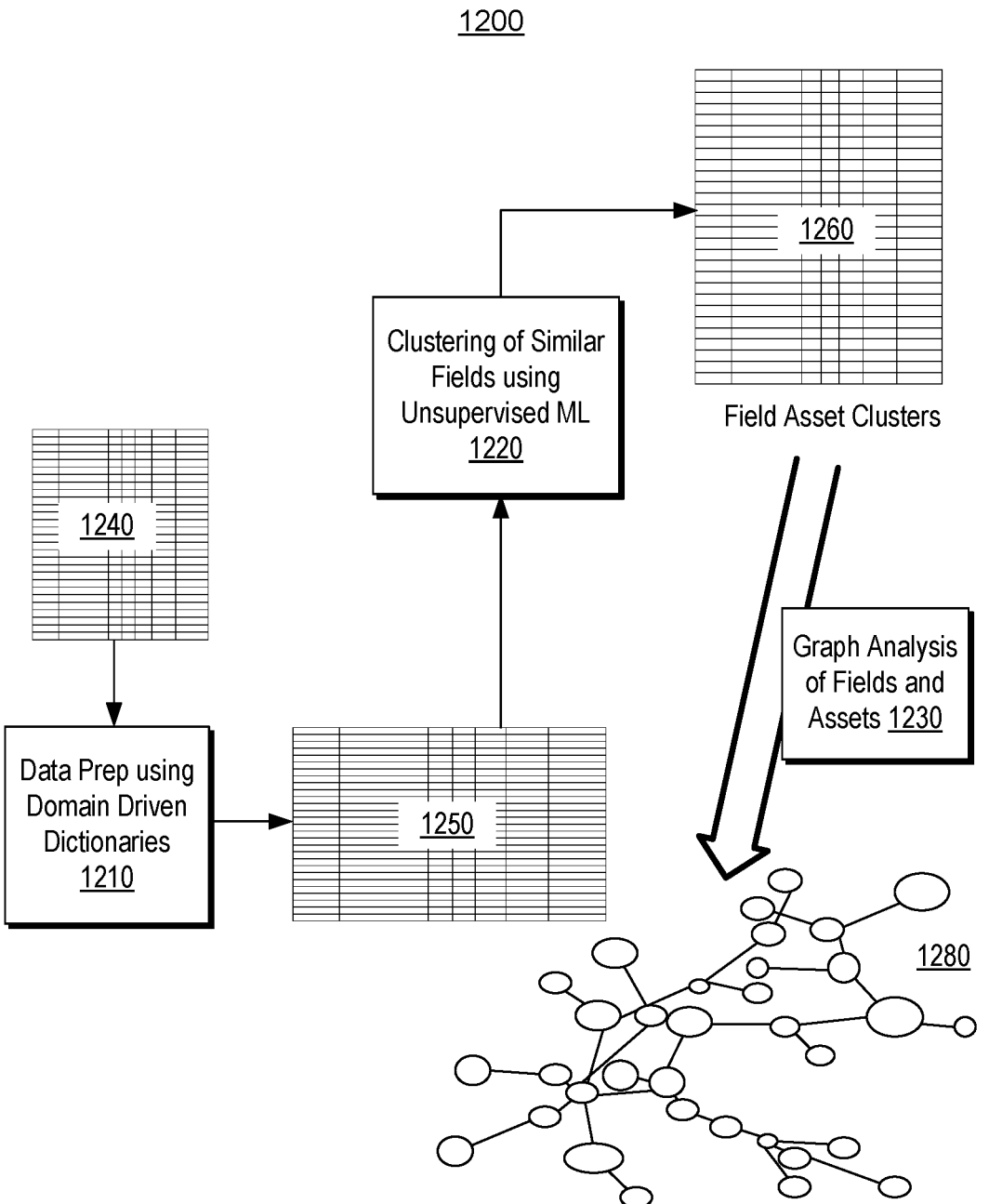
FIG. 12 illustrates an example of a system.

FIG. 12 shows an example of a system 1200 that includes various process blocks 1210, 1220 and 1230 along with data structures 1240, 1250 and 1260 and a graph 1280 that can be rendered to a display, for example, as part of a GUI. As shown, the block 1210 can prepare data from the data structure 1240 (e.g., or data structures) using one or more domain dictionaries (e.g., a corpus, grammar, other logic, etc.) to generate, augment, update, etc., the data structure 1250. As an example, the data structure 1240, which may be stored in one or more databases, can be updated in real-time, near real-time, etc. For example, as field data, lab data, etc., become available, the data structure 1240 can be increased as to an amount of data. In such an example, the block 1210 can operate dynamically in generating, augmenting, updating, etc., the data structure 1250. As shown, the block 1220 can process data in the data structure 1250 using machine learning (ML). For example, consider a machine learning model that can cluster fields using data of the data structure 1250 via unsupervised machine learning. As shown, the block 1220 can generate, augment, update, etc., the data structure 1260, which can include, for example, field asset clusters. The block 1230 can provide for graph analysis of the fields and assets, for example, via rendering one or more graphs such as the example graph 1280 to a display.

In the example of FIG. 12, the system 1200 can utilize one or more virtual distances, for example, in preparing the data per the block 1210 to generate, etc., the data structure 1250 and/or in clustering per the block 1220. As explained, a graph can be rendered where nodes can represent fields and/or assets where a dimension between nodes can be based at least in part on a virtual distance or virtual distances. As explained, a graph can be navigable such that a user can travel through a multidimensional space, for example, to find one or more analogues for a target region, etc.

As an example, the system 1200 can include one or more processors, memory accessible to the one or more processors, processor-executable instructions, data interfaces, etc.

The system 1200 may be a single computer or may be a distributed computing system (e.g., consider a system implemented using cloud-based resources, etc.).

As an example, the system 1200 can be utilized as a prospect analogue tool. For example, consider generation of a distance table that utilizes virtual distances between depositional environments (e.g., based at least in part on geographical and lithological distances) to provide segments that can capture some physical relationship or physical relationships between various aspects of depositional environments. As an example, consider the data structure 900 of FIG. 9 as being a table with virtual distances that exhibit some physical relationships. As explained, a sequence of numbers can be utilized for generation of virtual distances. For example, Fibonacci numbers can be utilized, where a portion or portions of a Fibonacci sequence may be an underlying basis for virtual distances (e.g., directly, through weighting, etc.). As an example, the data structure 900 of FIG. 9 may be represented with color. For example, consider a color coding scheme that associates colors with various Fibonacci numbers. In such an example, consider green being a low value pole, while red is a long distance pole. With respect to the data structure 900, entries with low values may be colored green while entries with high values may be colored red. As an example, a color spectrum may be utilized and/or one or more other color schemes (e.g., green, yellow, red, etc.). With color coding, a user may readily identify similar and dissimilar depositional environments. As mentioned, the data structure 900 is a partial data structure as it can include as many columns as rows (e.g., columns 1 to 5 of 29 columns are shown).

As an example, the system 1200 can be operatively coupled to one or more computational frameworks. For example, consider the PETREL framework, the TECHLOG framework, etc. As an example, the system 1200 may be part of the DELFI framework or operatively coupled to the DELFI framework. For example, the GUI 120 of FIG. 1 can include a graphical control that can instantiate a GUI such as the GUI 1100 of FIG. 11 and/or one or more of the sub-GUIs 1110, 1130 and 1150. In such an example, a workflow can include one or more analogue searches where data from the PETREL framework, TECHLOG framework, etc., are available and structured (e.g., optionally clustered, etc.) for purposes of analogue searching. As indicated in FIG. 1, the visualization 123 can utilize one or more types of rendering or graphics frameworks (e.g., consider OpenGL, etc.), which can be suitable for rendering graphs for graph-based navigation, searching, etc. As an example, one or more graphics of depositional environments may be rendered, for example, using vector graphics and/or other graphics. As explained, a workflow can include making one or more API calls. As explained, data can be processed in real-time or near real-time. For example, as one or more users utilize features of the DELFI framework, data may be generated and/or acquired where such data can be processed to enrich one or more data structures that can include virtual distance-based relationships suitable for graph-based navigation and/or searching. As an example, a graph-based framework can provide for or call for tagging of data in a suitable manner to facilitate graph-based navigation and/or searching of fields, assets, etc.

With respect to the system 300 of FIG. 3, a graph-based framework may be accessible in one or more of the blocks 310, 320, 330, 340, 350 and 360. For example, in the block 310, geo data may be identified using a graph-based framework where data are acquired from an analogue uncovered using a graph structured at least in part through use of virtual distances. As an example, the block 360 can include making one or more operational decisions using an analogue uncovered using a graph structured at least in part through use of virtual distances. For example, consider decision making as to a field of interest and/or an analogue field. As explained, in various instances, data may be more readily acquired in an analogue field than a field of interest (e.g., a target field). In such an example, an appropriate analogue field may be identified and/or selected based at least in part on ease of data acquisition via one or more field operations (e.g., seismic imaging, drilling, logging, etc.).

As an example, a system can tag data generated and/or acquired using one or more computational frameworks, which may be operatively coupled to field equipment, lab equipment, etc. For example, consider tagging with some stratigraphic metaproperties and using a relationship framework to link at least a portion of the stratigraphic metaproperties. As explained, color coding may be utilized and/or one or more multidimensional graphs generated, which may facilitate quality control of relationships. For example, if a graph does not comport well with a physical representation of the properties, then further processing may occur, which may include additional data acquisition, further machine learning, etc.

As an example, a system can include a database and/or a generator of sequences. For example, consider a Fibonacci sequence generator that can generate various Fibonacci numbers. In such an example, an automated process can utilize one or more portions of a Fibonacci sequence as virtual distances for one or more properties. In such an example, data structures suitable for graph-based navigation and/or searching may be generated and subjected to quality control analysis to determine whether one or more criteria are met. For example, consider criteria such as a minimum multidimensional distance and a maximum multidimensional distance. Such criteria may help to constrain virtual distances in a manner to facilitate visualization of a graph on a display. For example, a graph can aim to be sized suitably for rendering to a standard display as characterized by a standard aspect ratio.

As an example, an option can be selectable to relax one or more criteria. In such an example, a virtual reality framework may be targeted where a virtual reality headset (VR headset) may be utilized where hand sensors, wrist sensors, a microphone, etc., may be utilized by a user to navigate and/or search a multidimensional graph rendered using a display or displays of the VR headset. For example, consider an ability to rotate a graph in multidimensional space and to point to a node where a gesture can "open" the node, which may be associated with a listing of fields and/or assets for review by the user. As an example, depending on available data, a VR headset may allow for navigation through imagery, which may be actual imagery and/or computer generated imagery (e.g., an Earth model, etc.) of a field and/or an asset. As an example, where some amount of data exist for a target region, a system may generate a composite model, a composite image, etc., to illustrate why an analogue may be suitable for the target region. As explained, drilling may be easier in an analogue region than a target region. As an example, a VR experience can include simulated drilling in an analogue region where data are acquired (e.g., via interpolation, etc.) to make one or more assessments as to a target region.

Figure 13:
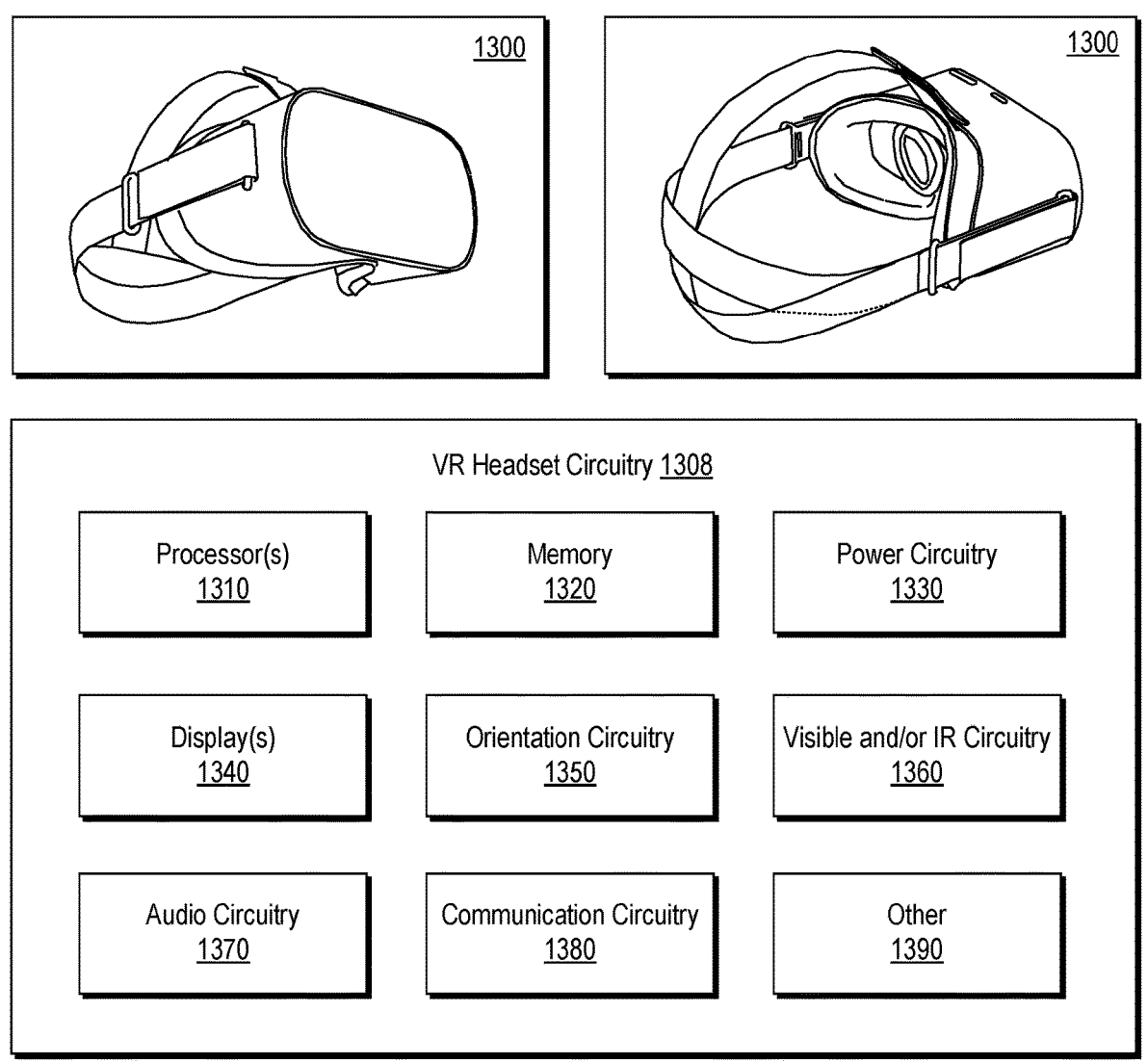
FIG. 13 illustrates an example of a virtual reality headset.

FIG. 13 shows an example of a VR headset 1300 that includes VR headset circuitry 1308, which can include one or more processors 1310, memory 1320 accessible to at least one of the one or more processors 1310, power circuitry

1330, one or more displays 1340, orientation circuitry 1350, visible and/or infrared (IR) circuitry 1360 (e.g., as locating circuitry, etc.), audio circuitry 1370, communication circuitry 1380 and optionally one or more other types of circuitry 1390.

As an example, the one or more displays 1340 may include two OLED displays with a combined resolution in excess of 1000×600, with a suitable refresh rate in excess of approximately 30 Hz. As an example, the orientation circuitry 1350 can include one or more of an accelerometer, a gyroscope, and a magnetometer. As an example, the visible and/or IR circuitry 1360 can include one or more IR emitters, one or more IR detectors, one or more visible wavelength detectors, etc. As an example, the audio circuitry 1370 can include one or more speakers (e.g., earphone speakers) and/or one or more wireless transmitters (e.g., BLUETOOTH, etc.).

As an example, a VR headset can include one or more features of the OCULUS GO VR headset. As an example, a VR headset can include a QUALCOMM SNAPDRAGON 821 SoC, 3 GB of LPDDR4 RAM, 32 GB or more of internal storage, an integrated ADRENO 530 GPU (e.g., approximately 500 GFLOPS of graphics performance), a 2600 mAh battery, non-positional three-degrees of freedom tracking, one or more proximity sensors, an accessory controller, a 5.5-inch LCD display with a 2560×1440 (1280× 1440 pixels per eye) resolution in an RGB-stripe subpixel arrangement, a field of view of approximately 100 degrees (e.g., a horizontal pixel density of approximately 12.67 pixels per degree), and Fresnel lenses. The foregoing VR headset is mentioned as an example, noting that other types may be suitable (e.g., MAGIC LEAP, etc.).

As mentioned, one or more wearables may be part of a VR headset system where a wearable may be grasped by a hand, strapped to a hand, strapped to a wrist, etc., and capable of instructing a VR headset, an application, etc., as to rendering, controls, etc.

As an example, in an augmented reality approach, a user may view an outcrop where the outcrop may be utilized as input, for example, being captured digitally using a camera and/or one or more other sensors (e.g., GPS, etc.), where captured data can be utilized for forward searching and/or reverse searching (e.g., the outcrop X is an analogue of Y1, Y2, . . . , YN or Y2 is an analogue of the outcrop X, etc.). In an augmented reality approach, a graphic such as the graphic 700 of FIG. 7 may be suitable for manipulation and rendering using hand motion where sensors of an augmented reality system can rotate, zoom, select, etc. In such an example, a search may be performed and where model and/or image data are available, an overlay may be generated such that the user may view the actual outcrop with an overlay of at least a portion of the model and/or image data. Such an approach can provide for on-site searching and assessments. As visiting a field site may involve travel to a remote location, where exploration time may be limited, analogue search framework accessibility the field site can enhance such exploration, sample gathering, etc. As to techniques for visualization, see through displays, mixed eye displays (e.g., one see through for seeing an outcrop and one not see through for viewing renderings), etc., may be utilized.

As an example, a graph may be based on a data structure where the graph can be represented using one or more forms. For example, consider a field based form or a lithology based form. In such an example, a field based form may represent nodes as wells where each of the wells is associated with one or more types of depositional environments. In a lithology based form, nodes may be represented as lithological types where each node can be associated with a well that has been drilled through a corresponding lithological type. As an example, a system can provide for toggling between one or more forms of a graph. As an example, a system can provide for rendering multiple forms of a graph simultaneously such that a user can compare data using multiple graphs.

Figure 14:
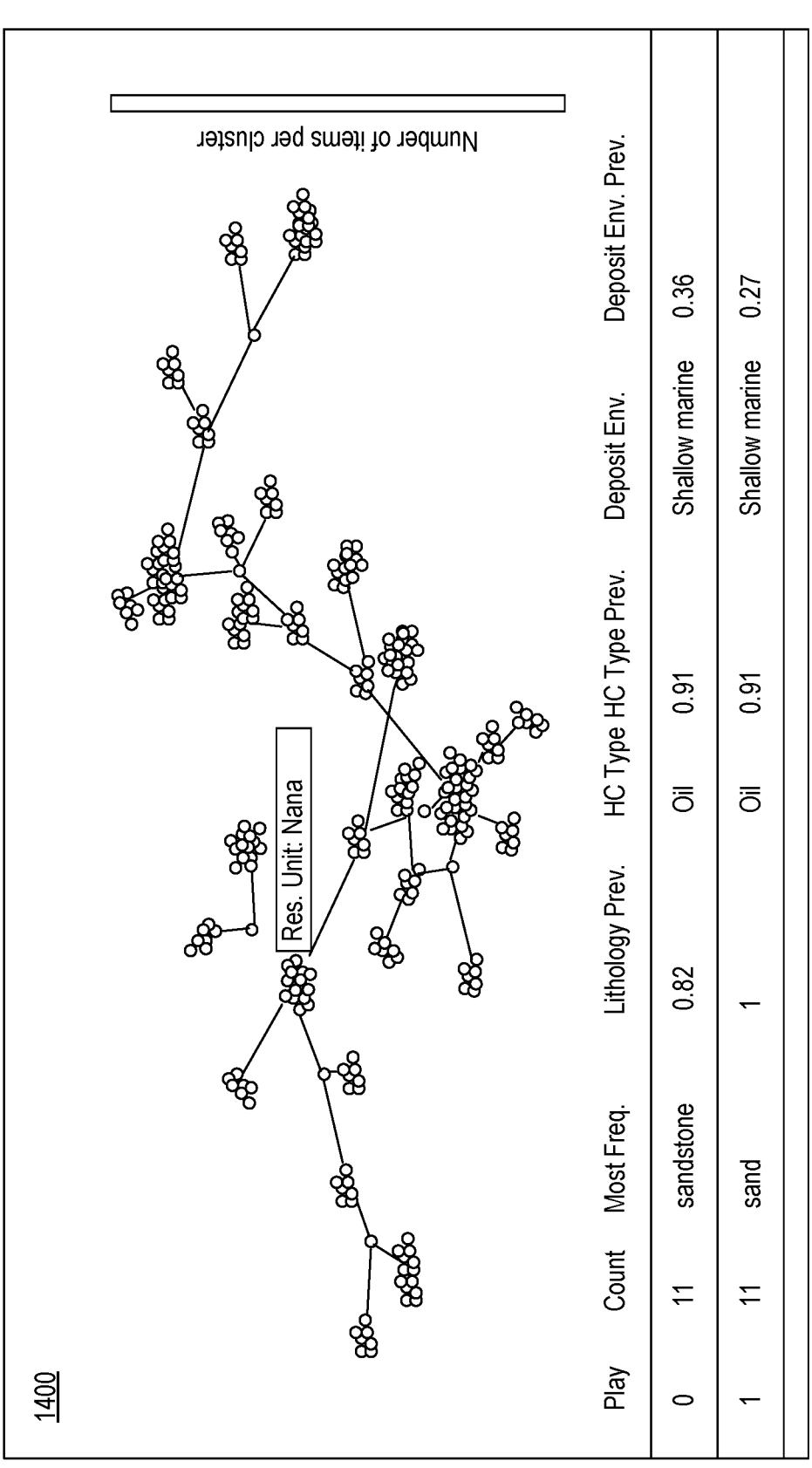
FIG. 14 illustrates an example of a graphical user interface.

FIG. 14 shows an example of a GUI 1400 that includes a graph and a data table listing. As shown, the graph can be coded using a spectrum for number of items per cluster. In the example of FIG. 14, virtual distances can be utilized in generating the graph where, for example, depositional environments can be related using virtual distances. As shown in FIG. 14, the data table listing can include information such a play group, count, most frequent lithology, lithology prevalence, hydrocarbon (HC) type, HC prevalence, depositional environment and depositional environment prevalence. The GUI 1400 is navigable where, for example, a node can be highlighted to cause rendering of additional information (see, e.g., reservoir unit: nana).

FIG. 15 shows an example of a system 1500 with various components, including a cluster component 1510 for clustering asset and/or field using one or more similarity metrics, a diagenetic information component 1520, a porosity, permeability and/or depth component 1530, a depositional environment as a string component 1540, an age component 1550 with a converter 1555 (e.g., string to floating value), a depositional environment distance metric component 1560 (e.g., geology based) with a corresponding dictionary 1565, a depositional environment distance metric component 1570 (e.g., lithology based) with a corresponding dictionary 1575, and a lithologies of reservoir component 1580 with a lithology string converter 1584 and a synonym merger 1588.

Figure 16:
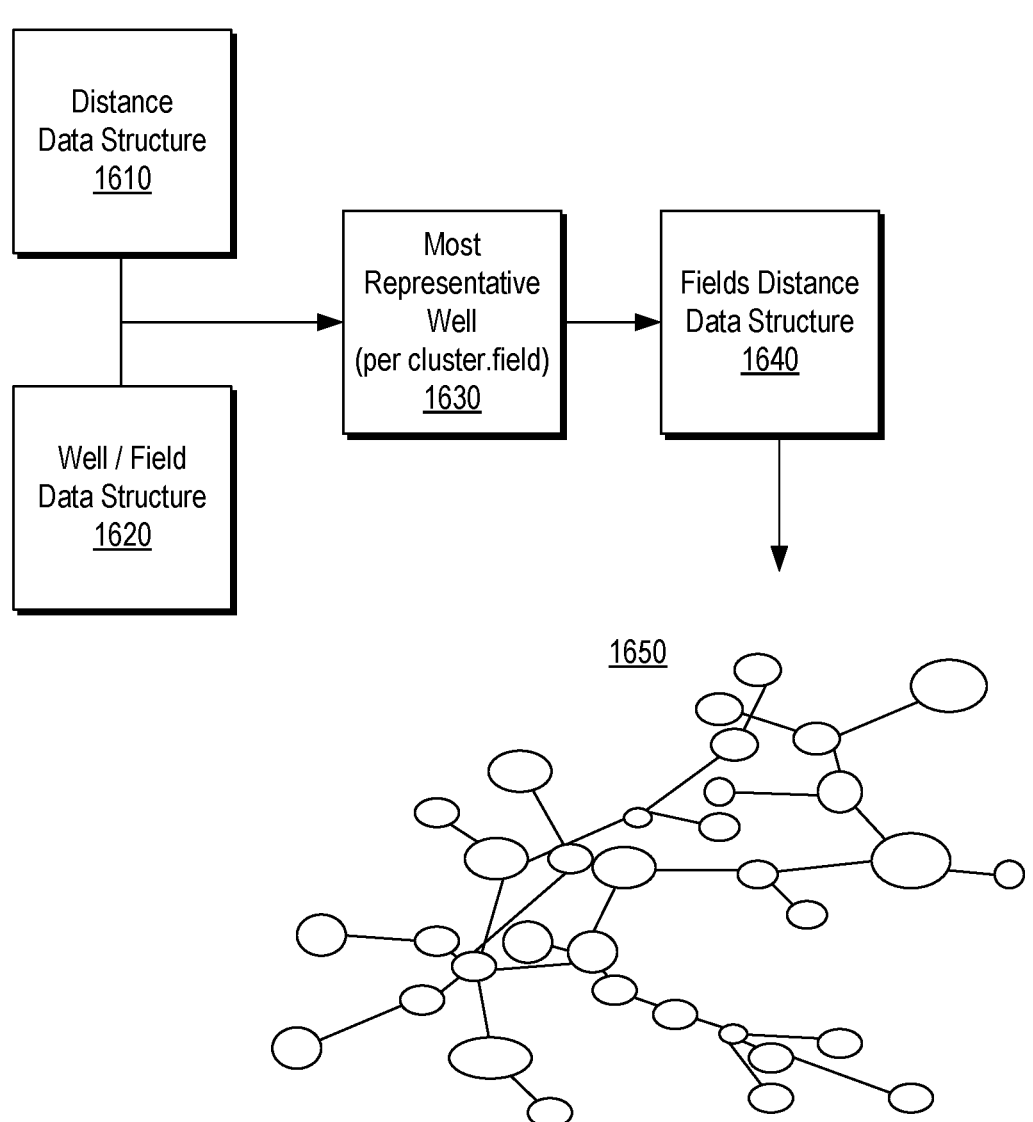
FIG. 16 illustrates an example of a method.

FIG. 16 shows an example of a method 1600 that includes a provision block 1610 for providing a distance data structure, a provision block 1620 for providing a well/field data structure, a generation block 1630 for generating a most representative well per cluster, and a generation block 1640 for generating a fields distance data structure, which can be utilized for rendering a graph 1650. In such an example, the most representative well per cluster of a field can be utilized as a basis for generating nodes with associated distances such that the data structure of the block 1640 is suitable for graph generation as indicated by the example graph 1650.

In the examples of FIG. 15 and/or FIG. 16, age can be included in clustering where, for example, characteristics of age may be utilized for a play/prospect. In such an example, a query may return search results of similar fields (e.g., graphically, a listing, etc.). As an example, a field data set can be processed for information such as, for example, one or more of logs, formation tops, well locations, well trajectories, etc. As an example, a system may include accessing various web-based data stores to scrape information. For example, consider accessing a public (e.g., government, etc.) database that includes data gathered through various projects, regulations, studies, etc.

As an example, a system can include a search service that can be utilized as an outward facing service for access by one or more users. In such an example, the system can be operatively coupled to one or more computational frameworks for data acquisition, enrichment, etc. For example, consider an active crawler that can search one or more resources for data and that can add to data structures to enhance navigation and/or search facilities.

As explained, a system can be dynamic in that it may update itself. For example, consider a system that can implement one or more techniques for performance optimization for similarity computations that can underlie graph-based navigation and/or search. Such an approach may aim to generate and assess clusters, including spatial distances between clusters where such spatial distances can depend at least in part on virtual distances. As an example, over time, as data are added, a system may shift virtual distances along a sequence. As explained, such a shift may be utilized to constrain a graph, which may be for rendering to a display and/or rendering in a VR environment, an AR environment, etc.

As explained, analysis of a target region can be confounded by no or sparse data, which can make the target region difficult to assess. Further, various regions exist that have been put on hold or disregarded due to a lack of data. As explained, a system can be dynamic in that it can acquire data and generate data structures suitable for navigation and/or search, particularly with respect to uncovering one or more analogues. As an example, a system can include a database with regions that are on hold or disregard status where the system may automatically assess such regions as new data are acquired. For example, consider a background process that can operate in an unsupervised manner and that can issue an alert that indicates data acquired may be sufficient to change the status of a region. Such a system can help to address past decisions to discard a prospect, where previously such decisions were not re-visited when new data became available. As an example, a system may help to reduce detrimental aspects of personal experience and/or bias.

As an example, a system can provide for navigation of data in a manner that allows a user to more readily identify a similar well zone during an assessment of a prospect. In such an example, a user may assess hydrocarbon presence and/or likelihood of trapped hydrocarbons, which may, in turn, give a basis for decision making as to one or more field operations in a target region and/or in an analogue.

As an example, clustering may consider log data, petrophysical footprint data, etc. As explained, a system can access one or more databases of assets/prospects with attributes such as, for example, one or more of age, depositional environment, hydrocarbon type, lithology, seal type, petrophysical properties, diagenetic effect, etc. As explained, one or more APIs may be utilized for making API calls and receiving data responsive to such API calls (e.g., consider the ELC API for age, etc.). As an example, a graph can be based at least in part on virtual distances where groups of "similar" assets/prospects can be identified and, for example, one or more outlier asset/prospects.

FIG. 17 shows an example of a method 1700 that includes an access block 1710 for, responsive to receipt of a search instruction that includes one or more search criteria, accessing a data structure for subsurface geologic regions categorized at least in part according to parameters that describe depositional environments, where the data structure includes virtual distances between the parameters; a generation block 1720 for generating a search result using the one or more search criteria and the data structure, where the search result represents an organization of at least a portion of subsurface geologic regions as closest analogues to the one or more search criteria; and a transmission block 1730 for transmitting search result information for graphically rendering the search result to a display as part of an interactive graphical user interface.

The method 1700 is shown in FIG. 17 in association with various computer-readable media (CRM) blocks 1711, 1721 and 1731. Such blocks generally include instructions suitable for execution by one or more processors (or processor cores) to instruct a computing device or system to perform one or more actions. While various blocks are shown, a single medium may be configured with instructions to allow for, at least in part, performance of various actions of the method 1700. As an example, a computer-readable medium (CRM) may be a computer-readable storage medium that is non-transitory and that is not a carrier wave. As an example, one or more of the blocks 1711, 1721 and 1713 may be in the form processor-executable instructions, for example, consider the one or more sets of instructions 270 of the system 250 of FIG. 2, etc.

Machine learning (ML) can be considered an artificial intelligence technology where a computational framework can train a machine learning model (ML model) using training data to generate a trained ML model. A trained ML model may be utilized for one or more purposes. For example, consider a predictive trained ML model, a decision making trained ML model, etc.

As to types of machine learning models, consider one or more of a support vector machine (SVM) model, a k-nearest neighbors (KNN) model, an ensemble classifier model, a neural network (NN) model, etc. As an example, a machine learning model can be a deep learning model (e.g., deep Boltzmann machine, deep belief network, convolutional neural network, stacked auto-encoder, etc.), an ensemble model (e.g., random forest, gradient boosting machine, bootstrapped aggregation, AdaBoost, stacked generalization, gradient boosted regression tree, etc.), a neural network model (e.g., radial basis function network, perceptron, back-propagation, Hopfield network, etc.), a regularization model (e.g., ridge regression, least absolute shrinkage and selection operator, elastic net, least angle regression), a rule system model (e.g., cubist, one rule, zero rule, repeated incremental pruning to produce error reduction), a regression model (e.g., linear regression, ordinary least squares regression, stepwise regression, multivariate adaptive regression splines, locally estimated scatterplot smoothing, logistic regression, etc.), a Bayesian model (e.g., naïve Bayes, average on-dependence estimators, Bayesian belief network, Gaussian naïve Bayes, multinomial naïve Bayes, Bayesian network), a decision tree model (e.g., classification and regression tree, iterative dichotomiser 3, C4.5, C5.0, chi-squared automatic interaction detection, decision stump, conditional decision tree, M5), a dimensionality reduction model (e.g., principal component analysis, partial least squares regression, Sammon mapping, multidimensional scaling, projection pursuit, principal component regression, partial least squares discriminant analysis, mixture discriminant analysis, quadratic discriminant analysis, regularized discriminant analysis, flexible discriminant analysis, linear discriminant analysis, etc.), an instance model (e.g., k-nearest neighbor, learning vector quantization, self-organizing map, locally weighted learning, etc.), a clustering model (e.g., k-means, k-medians, expectation maximization, hierarchical clustering, etc.), etc.

As an example, a machine model, which may be a machine learning model, may be built using a computational framework with a library, a toolbox, etc., such as, for example, those of the MATLAB framework (MathWorks, Inc., Natick, Massachusetts). The MATLAB framework includes a toolbox that provides supervised and unsupervised machine learning algorithms, including support vector machines (SVMs), boosted and bagged decision trees, k-nearest neighbor (KNN), k-means, k-medoids, hierarchical clustering, Gaussian mixture models, and hidden Markov models. Another MATLAB framework toolbox is the Deep Learning Toolbox (DLT), which provides a framework for designing and implementing deep neural networks with algorithms, pretrained models, and apps. The DLT provides convolutional neural networks (ConvNets, CNNs) and long short-term memory (LSTM) networks to perform classification and regression on image, time-series, and text data. The DLT includes features to build network architectures such as generative adversarial networks (GANs) and Siamese networks using custom training loops, shared weights, and automatic differentiation. The DLT provides for model exchange various other frameworks.

As an example, a trained ML model (e.g., a trained ML tool that includes hardware, etc.) can be utilized for one or more tasks. As an example, various types of data may be acquired and optionally stored, which may provide for training one or more ML models, for retraining one or more ML models, for further training of one or more ML models, and/or for offline analysis, etc.

As an example, the TENSORFLOW framework (Google LLC, Mountain View, CA) may be implemented, which is an open source software library for dataflow programming that includes a symbolic math library, which can be implemented for machine learning applications that can include neural networks. As an example, the CAFFE framework may be implemented, which is a DL framework developed by Berkeley AI Research (BAIR) (University of California, Berkeley, California). As another example, consider the SCIKIT platform (e.g., scikit-learn), which utilizes the PYTHON programming language. As an example, a framework such as the APOLLO AI framework may be utilized (APOLLO.AI GmbH, Germany). As an example, a framework such as the PYTORCH framework may be utilized (Facebook AI Research Lab (FAIR), Facebook, Inc., Menlo Park, California).

As an example, a method can include responsive to receipt of a search instruction that includes one or more search criteria, accessing a data structure for subsurface geologic regions categorized at least in part according to parameters that describe depositional environments, where the data structure includes virtual distances between the parameters; generating a search result using the one or more search criteria and the data structure, where the search result represents an organization of at least a portion of subsurface geologic regions as closest analogues to the one or more search criteria; and transmitting search result information for graphically rendering the search result to a display as part of an interactive graphical user interface. In such an example, the virtual distances mimic distances between depositional environments of an idealized graphic of depositional environments. As an example, virtual distances can mimic distances between depositional environments of an actual region of the Earth. In such an example, virtual distances can be tailored to, customized for, etc., a particular region of the Earth, etc.

As an example, virtual distances may be determined using numbers of a geometric sequence. As an example, virtual distances may be determined using numbers of a Fibonacci sequence.

As an example, depositional environments can include more than 10 different depositional environments. In such an example, the depositional environment may span a range of elevations as may be characterized as existing between mountain and seafloor (e.g., high to low); noting that various geological processes can alter sediment, etc., over time such that a former seabed is today elevated, etc.

As an example, a search result can include clusters. In such an example, each of the clusters can include at least one associated well in a subsurface geologic region.

As an example, a search instruction can be received responsive to actuation of a graphical control of the interactive graphical user interface. For example, consider one or more of a graphical control that includes a perspective view of an idealized region of the Earth associated with depositional environment criteria, a graphical control that includes a graph associated with depositional environment criteria, a graphical control that includes an age spectrum associated with one or more age criteria, a graphical control that includes a depth spectrum associated with one or more depth criteria, etc.

As an example, a method can include updating a data structure responsive to acquisition of data for one or more subsurface geologic regions or one or more additional subsurface geologic regions. In such an example, updating can include clustering based at least in part on a portion of the data. For example, consider clustering that includes unsupervised machine learning to generate clusters of assets. As an example, a method can include automatically generating an updated search result and transmitting updated search result information for graphically rendering the updated search result.

As an example, a method can include updating a data structure responsive to acquisition of data for one or more subsurface geologic regions or one or more additional subsurface geologic regions and issuing a notification that indicates that field data are relevant to a prior search instruction. For example, consider issuing a notification for a target region that has been placed on hold due to lack of data, etc.

As mentioned, a method can include rendering using one or more types of display technologies, which can include one or more displays, headsets (e.g., VR, AR, etc.), etc. As explained, a geologic region of interest may be exposed such that photography and/or one or more other types of data acquisition may be utilized for purposes of generating data that can be utilized for searching, adding to a database, determining one or more virtual distances, etc. As an example, a framework may be implemented at a field site where imagery, etc., may be acquired at the field site for purposes of searching, adding to a dataset, adding to a database, adjusting a data structure, determining one or more virtual distances, etc.

As an example, a system can include one or more processors; memory accessible to at least one of the one or more processors; processor-executable instructions stored in the memory and executable to instruct the system to: responsive to receipt of a search instruction that includes one or more search criteria, access a data structure for subsurface geologic regions categorized at least in part according to parameters that describe depositional environments, where the data structure includes virtual distances between the parameters; generate a search result using the one or more search criteria and the data structure, where the search result represents an organization of at least a portion of subterranean geologic regions as closest analogues to the one or more search criteria; and transmit search result information for graphically rendering the search result to a display as part of an interactive graphical user interface.

As an example, one or more computer-readable storage media can include processor-executable instructions to instruct a computing system to: responsive to receipt of a search instruction that includes one or more search criteria, access a data structure for subsurface geologic regions categorized at least in part according to parameters that describe depositional environments, where the data structure includes virtual distances between the parameters; generate a search result using the one or more search criteria and the data structure, where the search result represents an organization of at least a portion of subterranean geologic regions as closest analogues to the one or more search criteria; and transmit search result information for graphically rendering the search result to a display as part of an interactive graphical user interface.

As an example, a computer program product can include one or more computer-readable storage media that can include processor-executable instructions to instruct a computing system to perform one or more methods and/or one or more portions of a method.

In some embodiments, a method or methods may be executed by a computing system. FIG. 18 shows an example of a system 1800 that can include one or more computing systems 1801-1, 1801-2, 1801-3 and 1801-4, which may be operatively coupled via one or more networks 1809, which may include wired and/or wireless networks.

As an example, a system can include an individual computer system or an arrangement of distributed computer systems. In the example of FIG. 18, the computer system 1801-1 can include one or more modules 1802, which may be or include processor-executable instructions, for example, executable to perform various tasks (e.g., receiving information, requesting information, processing information, simulation, outputting information, etc.).

As an example, a module may be executed independently, or in coordination with, one or more processors 1804, which is (or are) operatively coupled to one or more storage media 1806 (e.g., via wire, wirelessly, etc.). As an example, one or more of the one or more processors 1804 can be operatively coupled to at least one of one or more network interface 1807. In such an example, the computer system 1801-1 can transmit and/or receive information, for example, via the one or more networks 1809 (e.g., consider one or more of the Internet, a private network, a cellular network, a satellite network, etc.).

As an example, the computer system 1801-1 may receive from and/or transmit information to one or more other devices, which may be or include, for example, one or more of the computer systems 1801-2, etc. A device may be located in a physical location that differs from that of the computer system 1801-1. As an example, a location may be, for example, a processing facility location, a data center location (e.g., server farm, etc.), a rig location, a wellsite location, a downhole location, etc.

As an example, a processor may be or include a microprocessor, microcontroller, processor module or subsystem, programmable integrated circuit, programmable gate array, or another control or computing device.

As an example, the storage media 1806 may be implemented as one or more computer-readable or machine-readable storage media. As an example, storage may be distributed within and/or across multiple internal and/or external enclosures of a computing system and/or additional computing systems.

As an example, a storage medium or storage media may include one or more different forms of memory including semiconductor memory devices such as dynamic or static random access memories (DRAMs or SRAMs), erasable and programmable read-only memories (EPROMs), electrically erasable and programmable read-only memories (EEPROMs) and flash memories, magnetic disks such as fixed, floppy and removable disks, other magnetic media including tape, optical media such as compact disks (CDs) or digital video disks (DVDs), BLUERAY disks, or other types of optical storage, or other types of storage devices.

As an example, a storage medium or media may be located in a machine running machine-readable instructions, or located at a remote site from which machine-readable instructions may be downloaded over a network for execution.

As an example, various components of a system such as, for example, a computer system, may be implemented in hardware, software, or a combination of both hardware and software (e.g., including firmware), including one or more signal processing and/or application specific integrated circuits.

As an example, a system may include a processing apparatus that may be or include a general purpose processors or application specific chips (e.g., or chipsets), such as ASICs, FPGAs, PLDs, or other appropriate devices.

FIG. 19 shows components of an example of a computing system 1900 and an example of a networked system 1910 with a network 1920. The system 1900 includes one or more processors 1902, memory and/or storage components 1904, one or more input and/or output devices 1906 and a bus 1908. In an example embodiment, instructions may be stored in one or more computer-readable media (e.g., memory/storage components 1904). Such instructions may be read by one or more processors (e.g., the processor(s) 1902) via a communication bus (e.g., the bus 1908), which may be wired or wireless. The one or more processors may execute such instructions to implement (wholly or in part) one or more attributes (e.g., as part of a method). A user may view output from and interact with a process via an I/O device (e.g., the device 1906). In an example embodiment, a computer-readable medium may be a storage component such as a physical memory storage device, for example, a chip, a chip on a package, a memory card, etc. (e.g., a computer-readable storage medium).

In an example embodiment, components may be distributed, such as in the network system 1910. The network system 1910 includes components 1922-1, 1922-2, 1922-3, . . . 1922-N. For example, the components 1922-1 may include the processor(s) 1902 while the component(s) 1922-3 may include memory accessible by the processor(s) 1902. Further, the component(s) 1922-2 may include an I/O device for display and optionally interaction with a method. A network 1920 may be or include the Internet, an intranet, a cellular network, a satellite network, etc.

As an example, a device may be a mobile device that includes one or more network interfaces for communication of information. For example, a mobile device may include a wireless network interface (e.g., operable via IEEE 802.11, ETSI GSM, BLUETOOTH, satellite, etc.). As an example, a mobile device may include components such as a main processor, memory, a display, display graphics circuitry (e.g., optionally including touch and gesture circuitry), a SIM slot, audio/video circuitry, motion processing circuitry (e.g., accelerometer, gyroscope), wireless LAN circuitry, smart card circuitry, transmitter circuitry, GPS circuitry, and a battery. As an example, a mobile device may be configured as a cell phone, a tablet, etc. As an example, a method may be implemented (e.g., wholly or in part) using a mobile device. As an example, a system may include one or more mobile devices.

As an example, a system may be a distributed environment, for example, a so-called "cloud" environment where various devices, components, etc. interact for purposes of data storage, communications, computing, etc. As an example, a device or a system may include one or more components for communication of information via one or more of the Internet (e.g., where communication occurs via one or more Internet protocols), a cellular network, a satellite network, etc. As an example, a method may be implemented in a distributed environment (e.g., wholly or in part as a cloud-based service).

As an example, information may be input from a display (e.g., consider a touchscreen), output to a display or both. As an example, information may be output to a projector, a laser device, a printer, etc. such that the information may be viewed. As an example, information may be output stereographically or holographically. As to a printer, consider a 2D or a 3D printer. As an example, a 3D printer may include one or more substances that can be output to construct a 3D object. For example, data may be provided to a 3D printer to construct a 3D representation of a subterranean formation. As an example, layers may be constructed in 3D (e.g., horizons, etc.), geobodies constructed in 3D, etc. As an example, holes, fractures, etc., may be constructed in 3D (e.g., as positive structures, as negative structures, etc.).

Although only a few example embodiments have been described in detail above, those skilled in the art will readily appreciate that many modifications are possible in the example embodiments. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures.

What is claimed is:

1. A method comprising:

responsive to receipt of a search instruction that comprises one or more search criteria representative of an analogue for a subsurface geologic region, accessing a data structure for subsurface geologic regions categorized at least in part according to parameters that describe lithological properties of depositional environments, wherein the data structure is generated using a machine learning model configured to generate clusters of nodes based on lithological data, wherein the clusters of nodes correspond to the parameters, wherein the parameters correspond to porosity, permeability, pore pressure, or any combination thereof, wherein the data structure comprises virtual distances between the parameters, and wherein each of the virtual distances corresponds to:

an amount of similarity between respective parameters; and a Fibonacci number;

generating a search result using the one or more search criteria, the data structure, and the virtual distances, wherein the search result represents an organization of at least a portion of the subsurface geologic regions as closest analogues to the one or more search criteria;

transmitting the search result for graphically rendering the search result to a display as part of an interactive graphical user interface;

determining whether a prospect is present in the subsurface geologic region based on the search result, wherein the prospect corresponds to a reservoir; and based on the determining, continuing drilling a borehole into the subsurface geologic region to penetrate the reservoir using drilling equipment in response to determining that the prospect is present in the subsurface geologic region; or discontinuing the drilling of the borehole into the subsurface geologic region using the drilling equipment in response to determining that the prospect is not present in the subsurface geologic region.

2. The method of claim 1, wherein the virtual distances mimic distances between additional depositional environments of an idealized graphic of the additional depositional environments.

3. The method of claim 1, wherein the virtual distances mimic distances between depositional environments of an actual region of the Earth.

4. The method of claim 1, wherein the virtual distances are determined using numbers of a geometric sequence.

5. The method of claim 1, wherein the lithological properties correspond to more than 10 different depositional environments.

6. The method of claim 1, wherein the search result is graphically rendered as at least a subset of the clusters of nodes.

7. The method of claim 6, wherein each node of the at least a subset of the clusters of nodes comprises at least one associated well in the respective subsurface geologic region.

8. The method of claim 1, wherein the search instruction is received responsive to actuation of a graphical control of the interactive graphical user interface.

9. The method of claim 8, wherein the interactive graphical user interface comprises a perspective view of an idealized region of the Earth associated with depositional environment criteria.

10. The method of claim 8, wherein the interactive graphical user interface comprises a graph associated with depositional environment criteria.

11. The method of claim 8, wherein the graphical control comprises an age spectrum associated with one or more age criteria.

12. The method of claim 8, wherein the graphical control comprises a depth spectrum associated with one or more depth criteria.

13. The method of claim 1, comprising generating an updated data structure responsive to acquisition of additional lithological data for one or more of the subsurface geologic regions or one or more additional subsurface geologic regions.

14. The method of claim 13, wherein generating the updated data structure comprises using the machine learning model to generate additional clusters of nodes based at least in part on a portion of the additional lithological data.

15. The method of claim 14, wherein generating the updated data structure comprises using unsupervised machine learning to generate the additional clusters of nodes.

16. The method of claim 13, comprising automatically generating an updated search result based at least in part on the updated data structure and transmitting the updated search result for graphically rendering the updated search result.

17. The method of claim 1, comprising generating an updated data structure responsive to acquisition of additional lithological data for one or more of the subsurface geologic regions or one or more additional subsurface geologic regions and issuing a notification that indicates that the additional lithological data is relevant to a prior search instruction.

18. A system comprising:

one or more processors;

memory accessible to the one or more processors;

processor-executable instructions stored in the memory and executable to instruct the one or more processors of the system to:

responsive to receipt of a search instruction that comprises one or more search criteria representative of an analogue for a subsurface geologic region, access a data structure for subsurface geologic regions categorized at least in part according to parameters that describe lithological properties of depositional environments, wherein the data structure is generated using a machine learning model configured to generate clusters of nodes based on lithological data, wherein the clusters of nodes correspond to the parameters, wherein the parameters correspond to porosity, permeability, pore pressure, or any combination thereof, wherein the data structure comprises virtual distances between the parameters, and wherein each of the virtual distances corresponds to:

an amount of similarity between respective parameters; and a Fibonacci number;

generate a search result using the one or more search criteria, the data structure, and the virtual distances, wherein the search result represents an organization of at least a portion of the subterranean geologic regions as closest analogues to the one or more search criteria;

transmit the search result for graphically rendering the search result to a display as part of an interactive graphical user interface;

determine whether a prospect is present in the subsurface geologic region based on the search result, wherein the prospect corresponds to a reservoir; and based on the determining, continue drilling a borehole into the subsurface geologic region to penetrate the reservoir using drilling equipment in response to determining that the prospect is present in the subsurface geologic region; or discontinue the drilling of the borehole into the subsurface geologic region using the drilling equipment in response to determining that the prospect is not present in the subsurface geologic region.

19. One or more tangible, non-transitory machine-readable media comprising instructions that, when executed by processing circuitry, cause the processing circuitry to perform operations comprising:

responsive to receipt of a search instruction that comprises one or more search criteria representative of an analogue for a subsurface geologic region, accessing a data structure for subsurface geologic regions categorized at least in part according to parameters that describe lithological properties of depositional environments, wherein the data structure is generated using a machine learning model configured to generate clusters of nodes based on lithological data, wherein the clusters of nodes correspond to the parameters, wherein the parameters correspond to porosity, permeability, pore pressure, or any combination thereof, wherein the data structure comprises virtual distances between the parameters, and wherein each of the virtual distances corresponds to:

an amount of similarity between respective parameters; and a Fibonacci number;

generating a search result using the one or more search criteria, the data structure, and the virtual distances, wherein the search result represents an organization of at least a portion of the subterranean geologic regions as closest analogues to the one or more search criteria;

transmitting the search result for graphically rendering the search result to a display as part of an interactive graphical user interface;

determining whether a prospect is present in the subsurface geologic region based on the search result, wherein the prospect corresponds to a reservoir; and based on the determining, continuing drilling a borehole into the subsurface geologic region to penetrate the reservoir using drilling equipment in response to determining that the prospect is present in the subsurface geologic region; or discontinuing the drilling of the borehole into the subsurface geologic region using the drilling equipment in response to determining that the prospect is not present in the subsurface geologic region.

20. The system of claim 18, wherein a magnitude of the Fibonacci number corresponding to each virtual distance between the respective parameters corresponds to a geographical distance between the respective parameters, a geological distance between the respective parameters, or both.

*     *     *     *     *